(12) United States Patent
Morris

(10) Patent No.: US 7,194,496 B2
(45) Date of Patent: Mar. 20, 2007

(54) SYSTEM AND METHOD FOR PRODUCING FUNCTIONS FOR GENERATING PSEUDO-RANDOM BIT SEQUENCES

(75) Inventor: John R. Morris, Simi Valley, CA (US)

(73) Assignee: Spirent Communications of Rockville, Inc., Rockville, MD (US)

( * ) Notice: Subject to any disclaimer, the term of this patent is extended or adjusted under 35 U.S.C. 154(b) by 671 days.

(21) Appl. No.: 10/428,049

(22) Filed: May 2, 2003

(65) Prior Publication Data

US 2004/0220985 A1  Nov. 4, 2004

(51) Int. Cl.
 G06F 1/02 (2006.01)
(52) U.S. Cl. .................................. 708/250; 708/252
(58) Field of Classification Search ............... 708/252, 708/256, 250
 See application file for complete search history.

(56) References Cited

U.S. PATENT DOCUMENTS

| 3,984,668 | A | | 10/1976 | Zetterberg et al. |
| 4,890,252 | A | | 12/1989 | Wang |
| 5,031,129 | A | * | 7/1991 | Powell et al. ............... 708/253 |
| 5,224,165 | A | * | 6/1993 | Reinhardt et al. ........... 380/47 |
| 5,377,265 | A | | 12/1994 | Wettengel et al. |
| 5,574,673 | A | | 11/1996 | Lowy |
| 5,926,070 | A | | 7/1999 | Barron et al. |
| 6,014,408 | A | | 1/2000 | Naruse et al. |
| 6,263,082 | B1 | | 7/2001 | Ishimoto et al. |
| 6,307,631 | B1 | | 10/2001 | Tazartes et al. |
| 6,339,645 | B2 | | 1/2002 | Smeets |
| 6,339,781 | B1 | | 1/2002 | Sasaki |
| 6,388,583 | B1 | | 5/2002 | Long et al. |
| 6,480,870 | B1 | | 11/2002 | Park |
| 6,763,363 | B1 | * | 7/2004 | Driscoll ..................... 708/252 |

* cited by examiner

Primary Examiner—Chuong D. Ngo
(74) Attorney, Agent, or Firm—Gilberto M. Villacorta; Phillip J. Articola; Foley & Lardner LLP

(57) ABSTRACT

In a system and method for producing functions for generating pseudo-random bit sequences, an extended shift register (ESR) is formed. Each bit in the ESR is shifted to a next higher bit and the lowest-order bit is replaced with an EXCLUSIVE-OR operation of at least two other bits in the ESR. A plurality of bit equations is generated. For each bit equation, a bit in the ESR is replaced with an AND operation between shifted contents of the ESR and one of a plurality of first bit masks that isolate the bit. Each of the plurality of bit equations is combined. Shifts of the same shift distance are merged. Redundant bit masks are removed. Bit masks are transformed into bit masks comprising a sequence of zero bits and one bits. Bit masks are replaced with bit shift operations to form a function for generating the pseudo-random bit sequences.

29 Claims, 11 Drawing Sheets

SYSTEM AND METHOD FOR PRODUCING FUNCTIONS FOR GENERATING PSEUDO-RANDOM BIT SEQUENCES

BACKGROUND

1. Field of the Invention

The present invention relates generally to the generation of pseudo-random bit sequences. More particularly, the present invention relates to a system and method for producing functions for generating pseudo-random bit sequences.

2. Background Information

International Telecommunication Union (ITU) recommendations, such as, for example, ITU recommendations O.150, O.151 and O.152, specify various pseudo-random bit sequences (PRBSs) for use in communications test equipment. In general, a PRBS is a binary sequence that exhibits random noise-like properties, but is distinguishable from truly random sequences in that it inherently or deliberately exhibits periodicity. A PRBS generator is a shift register with taps from two or more of its stages mathematically combined in a linear or non-linear fashion, and fed back to the input of the shift register in such a way as to produce a PRBS. In particular, for the ITU recommendations, each sequence is defined in terms of a linear feedback shift register (LFSR) configuration that will produce the required sequence, with, in some cases, additional processing.

Traditionally, PRBSs have been generated by dedicated hardware, such as, for example, a field-programmable gate array (FPGA). Unfortunately, the PRBS algorithms are not, at first blush, readily amenable to efficient software implementation, as their definitions specify algorithms for the generation of one bit at a time, and the generation of each bit requires several single bit operations. Processors are most efficient when processing several bits at a time.

Each PRBS in the ITU recommendations is specified as the output that results from a clocked shift register (SR) with the values of two of the stages being EXCLUSIVE-OR'ed together and fed back into the first stage. The PRBS can then be output from the last stage of the shift register. (In some cases, additional processing is specified, such as, for example, inversion or limits on the number of sequential zero bits.) The parameters defining each PRBS are the number of stages in the shift register, and the stages selected to be fed back to the first stage. For example, certain ITU recommendations specify a PRBS that results from the output of a 31 bit shift register with the values in stages 31 and 28 being EXCLUSIVE-OR'ed and fed back to the first stage. Other sequences are similar, but with different SR lengths and tap points.

SUMMARY OF THE INVENTION

A method and system are disclosed for producing functions for generating pseudo-random bit sequences. In accordance with exemplary embodiments of the present invention, according to a first aspect of the present invention, a system for producing functions for generating pseudo-random bit sequences includes a memory that stores the steps of a computer program to extend a length of a shift register to form an extended shift register. The extended shift register is comprised of a plurality of bits of information. The memory also stores the steps of a computer program to copy each bit in the extended shift register to a next higher bit, and to replace a lowest-order bit of the extended shift register with an EXCLUSIVE-OR operation of at least two other bits in the extended shift register. The memory stores the steps of a computer program to generate a plurality of bit equations. Each of the plurality of bit equations is associated with a bit in the extended shift register. Each of the plurality of bit equations comprises an EXCLUSIVE-OR operation of at least two other bits of the extended shift register from an iteration of a predetermined number of iterations of the plurality of bit equations. For each of the plurality of bit equations, the memory stores the steps of a computer program to replace a bit in the extended shift register with an AND operation between a shift of the contents of the extended shift register, to move the bit to a predetermined position within the extended shift register, and one of a plurality of first bit masks applied to the shifted contents of the extended shift register to isolate the bit. The memory stores the steps of a computer program to combine each of the plurality of bit equations using an EXCLUSIVE-OR operation, and to merge shifts of a same shift distance in the combined plurality of bit equations. A plurality of second bit masks is applied to the merged shifts. Each of the plurality of second bit masks comprises an OR operation between the first bit masks associated with the shifts of the same shift distance. The memory stores the steps of a computer program to remove redundant first and second bit masks from the merged and combined plurality of bit equations. The redundant first and second bit masks zero the same bits as those zeroed by a shift associated with the first and second bit masks. The memory stores the steps of a computer program to transform at least one of the plurality of first and second bit masks in the merged and combined plurality of bit equations into an associated one of a plurality of third bit masks comprising a sequence of zero bits and a sequence of one bits, when the at least one of the plurality of first and second bit masks is comprised of an absence of a sequence of zero bits and a sequence of one bits. The memory also stores the steps of a computer program to replace the plurality of first, second and third bit masks with bit shift operations in the merged and combined plurality of bit equations, to form a function for generating the pseudo-random bit sequences, advanced a predetermined number of bits per program iteration. The system also includes a processor for accessing the memory to execute the computer program.

According to a second aspect of the present invention, a method for producing functions for generating pseudo-random bit sequences includes the steps of: i.) extending a length of a shift register to form an extended shift register, wherein the extended shift register is comprised of a plurality of bits of information; ii.) copying each bit in the extended shift register to a next higher bit; iii.) replacing a lowest-order bit of the extended shift register with an EXCLUSIVE-OR operation of at least two other bits in the extended shift register; iv.) generating a plurality of bit equations, wherein each of the plurality of bit equations is associated with a bit in the extended shift register, wherein each of the plurality of bit equations comprises an EXCLUSIVE-OR operation of at least two other bits of the extended shift register from an iteration of a predetermined number of iterations of the plurality of bit equations; v.) for each of the plurality of bit equations, replacing a bit in the extended shift register with an AND operation between a shift of the contents of the extended shift register, to move the bit to a predetermined position within the extended shift register, and one of a plurality of first bit masks applied to the shifted contents of the extended shift register to isolate the bit; vi.) combining each of the plurality of bit equations using an EXCLUSIVE-OR operation; vii.) merging shifts of a same shift distance in the combined plurality of bit equations, wherein a plurality of second bit masks is applied to the merged shifts, and wherein each of the plurality of second bit masks comprises an OR operation between the first bit masks associated with the shifts of the same shift distance; viii.) removing redundant first and second bit masks from the merged and combined plurality of bit equations, wherein the redundant first and second bit masks zero the same bits as those zeroed by a shift associated with the first and second bit masks; ix.) transforming at least one of the plurality of first and second bit masks in the merged and combined plurality of bit equations into an associated one of a plurality of third bit masks comprising a sequence of zero bits and a sequence of one bits, when the at least one of the plurality of first and second bit masks is comprised of an absence of a sequence of zero bits and a sequence of one bits; and x.) replacing the plurality of first, second and third bit masks with bit shift operations in the merged and combined plurality of bit equations, to form a function for generating the pseudo-random bit sequences, advanced a predetermined number of bits per program iteration.

According to a third aspect of the present invention, a computer-readable medium contains a computer program for producing functions for generating pseudo-random bit sequences. The computer program performs the steps of: i.) extending a length of a shift register to form an extended shift register, wherein the extended shift register is comprised of a plurality of bits of information; ii.) copying each bit in the extended shift register to a next higher bit; iii.) replacing a lowest-order bit of the extended shift register with an EXCLUSIVE-OR operation of at least two other bits in the extended shift register; iv.) generating a plurality of bit equations, wherein each of the plurality of bit equations is associated with a bit in the extended shift register, wherein each of the plurality of bit equations comprises an EXCLUSIVE-OR operation of at least two other bits of the extended shift register from an iteration of a predetermined number of iterations of the plurality of bit equations; v.) for each of the plurality of bit equations, replacing a bit in the extended shift register with an AND operation between a shift of the contents of the extended shift register, to move the bit to a predetermined position within the extended shift register, and one of a plurality of first bit masks applied to the shifted contents of the extended shift register to isolate the bit; vi.) combining each of the plurality of bit equations using an EXCLUSIVE-OR operation; vii.) merging shifts of a same shift distance in the combined plurality of bit equations, wherein a plurality of second bit masks is applied to the merged shifts, and wherein each of the plurality of second bit masks comprises an OR operation between the first bit masks associated with the shifts of the same shift distance; viii.) removing redundant first and second bit masks from the merged and combined plurality of bit equations, wherein the redundant first and second bit masks zero the same bits as those zeroed by a shift associated with the first and second bit masks; ix.) transforming at least one of the plurality of first and second bit masks in the merged and combined plurality of bit equations into an associated one of a plurality of third bit masks comprising a sequence of zero bits and a sequence of one bits, when the at least one of the plurality of first and second bit masks is comprised of an absence of a sequence of zero bits and a sequence of one bits; and x.) replacing the plurality of first, second and third bit masks with bit shift operations in the merged and combined plurality of bit equations, to form a function for generating the pseudo-random bit sequences, advanced a predetermined number of bits per program iteration.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
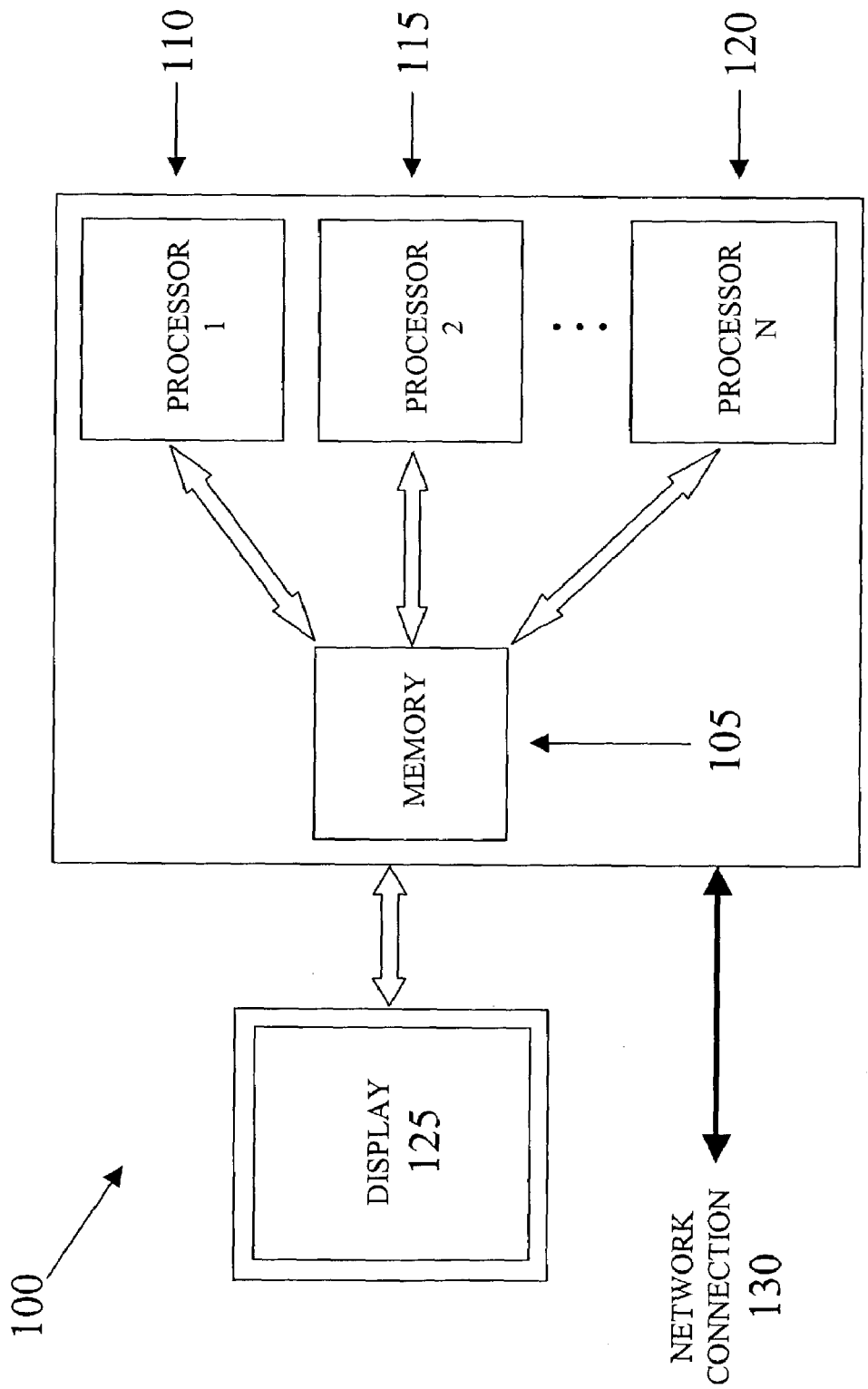
FIG. 1 is a block diagram illustrating a system for producing functions for generating pseudo-random bit sequences, in accordance with an exemplary embodiment of the present invention.

Exemplary embodiments of the present invention are directed to a system and method for producing functions for generating pseudo-random bit sequences (PRBSs). According to exemplary embodiments, the length of a shift register (SR) can be lengthened to the central processing unit (CPU or processor) word length, referred to as "W." The single-step bit equations are calculated. The single-step bit equations are the equations that define the value of each bit in the SR at each iteration in terms of the values in each bit of the SR at the previous iteration. There are W equations, one for each stage in the shift register. The W-step bit equations can then be determined therefrom. The W-step bit equations are the equations that define the value of each bit in the SR at each iteration in terms of the values in each bit W iterations earlier. There are also W equations. These W equations can be combined using EXCLUSIVE-OR operations into a single equation. Terms are then simulated—each term in the combined equation is replaced with the corresponding shift and mask operations. The terms in the combined equation are examined for operations that have the same shift distance, and each term is replaced by a single shift and mask operation. Redundant mask bits are removed. In particular, zeroes are shifted in to fill vacate positions when a word is shifted. In some cases, it will be known that masked-off bits are always zero, in which case the mask can be eliminated. Simple masks are generated by introducing additional terms to make the combined equation amenable to replacement of masks. "Simple masks" are those masks consisting only of a sequence of zero bits and a sequence of one bits. Masks are then replaced by shifts in the combined equation. Common sub-expressions within the combined equation can be identified and used to reduce the number of operations through pre-calculation. The resulting function can be used to generate PRBSs in which entire words of the PRBS can be read at once.

Every CPU or processor has a natural word length. In computer architecture, a "word" is a unit of data that can be moved in a single operation from storage to a processor register. For example, processors can have word lengths of 8, 16 or 32 bits, although processors of other word lengths are possible. Exemplary embodiments of the present invention can produce functions for generating PRBSs that will generate a full word of PRBS bits at each iteration. Although PRBS generation can be done by simulating existing bit serial hardware algorithms in software, then iterating the algorithm a number of times equal to the processor word length, such a method is slow.

For a PRBS based on an n-stage SR, the next n output bits are the current contents of the individual SR stages. Bits are shifted sequentially from first to last stage without modification: the feedback only affects the first stage. According to exemplary embodiments, each PRBS of interest can also be implemented using a longer shift register, so long as the same tap points are used. For example, the PRBS generated from a 15-stage SR with EXCLUSIVE-OR feedback from stages 15 and 14 can also be generated (with 17 bits delay) from a 32-stage SR with EXCLUSIVE-OR feedback from stages 15 and 14. Thus, according to exemplary embodiments, entire words of the PRBS can be read at once by lengthening the SR to the machine word length, then running word-length iterations of the function, generated according to exemplary embodiments of the present invention, to get the next word-length bits in the shift register. Exemplary embodiments produce functions for generating PRBSs that take advantage of the word length of the processor.

In the following discussion, the following conventions will be used:

The bits in a word are numbered 1 to W, starting at the lowest order bit. W is the processor word length.

Bit 1 in a word corresponds to stage 1 in the emulated shift register.

The initial value of bit n of the machine word is designated $B_n$. The value of that bit at the next iteration of the basic hardware algorithm is designated $B_n^i$. The value of that bit at m iterations of the basic hardware algorithm is designated $B_n^m$, when m is in the form of a Roman numeral.

"⊕" indicates the EXCLUSIVE-OR operation. When applied to multi-bit values, it indicates a bit-wise EXCLUSIVE-OR.

"<<" indicates a logical shift left operation. In this, bits are shifted from low to high order, with zero bits being shifted into the low order.

">>" indicates a logical shift right operation. In this, bit are shifted from high to low order, with zero bits being shifted into the high order.

"&" indicates the logical AND operation. When applied to multi-bit values, it indicates a bit-wise logical AND.

"$0010_2$" and similar patterns indicate a base 2 (binary) number.

"0xABCD1234" and similar patterns indicate a base 16 (hexadecimal) number.

A number with no designation indicates a decimal number.

"n/m PRBS", where n and in are integers, is shorthand for the PRBS sequence generated by at least a n-bit shift register with EXCLUSIVE-OR feedback from stages n and m to stage 1. For example, "15/14 PRBS" means the PRBS sequence generated by a 15-bit shift register with EXCLUSIVE-OR feedback from stages 15 and 14 to stage 1.

These and other aspects of the present invention will now be described in greater detail. FIG. 1 is a block diagram illustrating a system 100 for producing functions for generating pseudo-random bit sequences.

The system 100 can be embodied, in whole or at least in part, in, for example, any type of personal computer (PC), a digital signal processing (DSP) processor or system, an application-specific integrated circuit (ASIC), a programmable read-only memory (PROM), an erasable programmable read-only memory (EPROM), an electrically-erasable programmable read-only memory (EEPROM), or the like.

The system 100 can include at least one memory 105. The memory 105 can be any type of computer memory or any other type of electronic storage medium that is located either internally or externally to the system 100, such as, for example, read-only memory (ROM), random access memory (RAM), compact disc read-only memory (CDROM), electro-optical memory, magneto-optical memory, or the like. As will be appreciated based on the following description, the memory 105 can, for example, be programmed using conventional techniques known to those having ordinary skill in the art of computer programming. The actual source code or object code for carrying out the steps of, for example, a computer program can be stored in the memory 105.

The system 100 can also include at least one processor 110, for example, to execute the computer program stored in the memory 105. The processor 110 can be any known processor, such as, for example, any type of microprocessor, such as the IXP1200 network processor from INTEL™ or the like, or any other type of processor. However, those of ordinary skill in the art will recognize that the system 100 can be any combination of hardware, software, and/or firmware. The system 100 can also include a display device 125. The display device 125 can be any type of computer monitor or video display device capable of displaying graphical and/or textual information. The system 100 can also include a network connection 130 for connecting the system 100 to one or more networks (e.g., intranets or internets) or other systems. The network connection 130 can be any type of network connection, such as, for example, an Ethernet connection, to a remote computer system, network or the like, or any other form of connection (e.g., a RS-232 connection, an optical link, a wireless connection, or the like) over which information can be communicated.

In the following discussion, numerous examples will be used for purposes of illustration and not limitation to facilitate the explanation of exemplary embodiments of the present invention. In the following example, the PRBS is generated from a 3-bit SR with EXCLUSIVE-OR feedback from stages 3 and 2 to stage 1, and it is implemented for a processor with a 4-bit word length. However, those of ordinary skill in the art will recognize that exemplary embodiments of the present invention can be applied to processors of any word length.

The memory 105 can store the steps of a computer program to extend a length of a shift register to form an extended shift register. In the present example, the 3-bit SR can be lengthened to 4 bits. According to exemplary embodiments, the length of the extended shift register is at least the word length of the processor 110. In the present example, the word length of the extended shift register is 4 bits. The memory 105 can store the steps of a computer program to copy or otherwise shift each bit in the extended shift register to a next higher bit. In the present example, in generating the single-step bit equations, each bit in the extended (4-bit) shift register is copied or otherwise shifted to the next higher bit, so the equations for all but the lowest-order bit are:

$$B_2^i = B_1$$
$$B_3^i = B_2$$
$$B_4^i = B_3 \quad (1)$$

The memory 105 can also store the steps of a computer program to replace a lowest-order bit of the extended shift register with an EXCLUSIVE-OR operation of at least two other bits in the extended shift register. In the present example, for the single-step bit equations, the new value for stage 1 is the EXCLUSIVE-OR of stages 2 and 3, given by:

$$B_1^i = B_2 \oplus B_3 \quad (2)$$

The memory 105 can store the steps of a computer program to generate a plurality of bit equations. Each of the plurality of bit equations comprises an EXCLUSIVE-OR operation of at least two other bits of the extended shift register from an iteration of a predetermined number of iterations of the plurality of bit equations. According to exemplary embodiments, the plurality of bit equations can be the W-step bit equations. Therefore, the predetermined number of iterations can be the word length of the extended shift register. In the present example, the predetermined number of iterations is 4 (i.e., W=4, the word length of the 4-bit processor of the present example). Continuing with the present example, at the second iteration, each bit depends on the values from the first iteration in the same way:

$$B_1^{ii} = B_2^i \oplus B_3^i$$
$$B_2^{ii} = B_1^i$$
$$B_3^{ii} = B_2^i$$
$$B_4^{ii} = B_3^i \oplus B_3^i \quad (3)$$

The values of $B_1^i \ldots B_3^i$ can be substituted from Equations (1) and (2) into Equations (3) to give:

$$B_1^{ii} = B_1 \oplus B_2$$
$$B_2^{ii} = B_2 \oplus B_3$$
$$B_3^{ii} = B_1$$
$$B_4^{ii} = B_2 \quad (4)$$

Applying the same one-step equations again, after the third iteration:

$$B_1^{iii} = B_2^{ii} \oplus B_3^{ii}$$
$$B_2^{iii} = B_1^{ii}$$
$$B_3^{iii} = B_2^{ii}$$
$$B_4^{iii} = B_3^{ii} \quad (5)$$

Substituting for $B_1^{ii} \ldots B_3^{ii}$ from the Equations (4) into the Equations (5) gives:

$$B_1^{iii} = B_2 \oplus B_3 \oplus B_1$$
$$B_2^{iii} = B_1 \oplus B_2$$
$$B_3^{iii} = B_2 \oplus B_3$$
$$B_4^{iii} = B_1 \quad (6)$$

For the results of the fourth and final iteration, the same one-step equations can be used again:

$$B_1^{iv} = B_2^{iii} \oplus B_3^{iii}$$
$$B_2^{iv} = B_1^{iii}$$
$$B_3^{iv} = B_2^{iii}$$
$$B_4^{iv} = B_3^{iii} \quad (7)$$

Substituting the Equations (6) into the Equations (7) gives:

$$B_1^{iv} = B_1 \oplus B_2 \oplus B_2 \oplus B_3$$
$$B_2^{iv} = B_2 \oplus B_3 \oplus B_1$$
$$B_3^{iv} = B_1 \oplus B_2$$
$$B_4^{iv} = B_2 \oplus B_3 \quad (8)$$

For the step to generate the plurality of bit equations, the memory 105 can store the steps of a computer program to remove pairs of redundant terms in each of the plurality of bit equations. According to exemplary embodiments, a pair of redundant terms comprises an EXCLUSIVE-OR operation between two of the same term. For example, in the first equation of Equations (8), the term $B_2$ occurs twice. Any bit value EXCLUSIVE-OR'ed with itself is zero, so these terms can be eliminated to give the final set of bit equations:

$$B_1^{iv} = B_1 \oplus B_3$$
$$B_2^{iv} = B_2 \oplus B_3 \oplus B_1$$
$$B_3^{iv} = B_1 \oplus B_2$$
$$B_4^{iv} = B_2 \oplus B_3 \quad (9)$$

For each of the plurality of bit equations, the memory 105 can store the steps of a computer program to replace a bit in the extended shift register with an AND operation between a shift of the contents of the extended shift register, to move the bit to a predetermined position within the extended shift register, and one of a plurality of first bit masks applied to the shifted contents of the extended shift register to isolate the bit. Each individual term (i.e., $B_1$, $B_2$ and $B_3$) on the right-hand side of the Equations (9) can be performed by shifting the entire word to move the bit to the required position, then applying the first mask to isolate that bit by performing an AND operation between the shifted word and an appropriate base 2 number. Continuing with the present example, the value of each bit on the left-hand side of Equations (9) can be obtained as follows:

Bit 1: $(W \& 0001_2) \oplus (W>>2l) \& 001_2)$

Bit 2: $(W \& 0010_2) \oplus ((W>>1) \& 0010_2) \oplus ((W<<1) \& 0010_2)$

Bit 3: $((W<<2) \& 0100_2) \oplus ((W<<1) \& 0100_2)$

Bit 4: $((W<<2) \& 1000_2) \oplus ((W<<1) \& 1000_2)$ (10)

Each of the four expressions in Equations (10) defines the value of a different bit in the output word. Consequently, if all four expressions are OR'ed together, the full output word will result. Because each expression defines a different bit, the combined equation can be implemented using EXCLUSIVE-OR, since INCLUSIVE-OR and EXCLUSIVE-OR are the same when one operand is known to be zero. Thus, the memory 105 can store the steps of a computer program to combine each of the plurality of bit equations using an EXCLUSIVE-OR operation. For example, a full equation for generating four bits of the PRBS according to the present example is:

$W^i = (W \& 0001_2) \oplus ((W>>2) \& 0001_2) \oplus$ $(W \& 0010_2) \oplus ((W>>1) \& 0010_2) \oplus ((W<<1) \& 0010_2) \oplus$ $((W<<2) \& 0100_2) \oplus (WW<<1) \& 0100_2) \oplus$ $((W<<2) \& 1000_2) \oplus ((W<<1) \& 1000_2)$ (11)

The memory 105 can store the steps of a computer program to merge shifts of a same shift distance in the combined plurality of bit equations. A plurality of second bit masks is applied to the merged shifts. Each of the plurality of second bit masks comprises an OR operation between the bit masks associated with the shifts of the same shift distance. Since order does not matter in a sequence of EXCLUSIVE-OR operations, the terms in Equation (11) can be re-arranged to group shifts of the same distance (i.e., terms that are shifted by the same amount) together:

$W^i = ((W<<2) \& 1000_2) \oplus ((W<<2) \& 0100_2) \oplus$ $((<<1) \& 0010_2) \oplus ((W<<1) \& 0100_2) \oplus ((W<<1) \& 1000_2) \oplus$ $(W \& 0001_2) \oplus (W \& 0010_2) \oplus$ $((W>>1) \& 0010_2) \oplus$ $((W>>2) \& 0001_2)$ (12)

Shifts of the same shift distance can then be merged into a single shift with a second bit mask comprising an OR operation between the first bit masks from the individual shifts:

$W^i = ((W>>2) \& 1100_2) \oplus$ $((W<<1) \& 1110_2) \oplus$ $(W \& 0011_2) \oplus$ $((W>>1) \& 0010_2) \oplus$ $((W>>2) \& 0001_2$ (13)

The memory 105 can also store the steps of a computer program to remove redundant first and second bit masks from the merged and combined plurality of bit equations. The redundant first and second bit masks zero the same bits as those zeroed by a shift associated with the first and second bit masks. For example, consider the first term in Equation (13): $((W<<2) \& 1100_2)$. Shifting a word two places left will bring two zero bits into the low order, so the mask $1100_2$ can be considered redundant, because the two low-order bits of the mask zero the same bits that were zeroed out by the associated shift. Consequently, the first term can be simplified to $(W<<2)$. Similarly, the second term in Equation (13)—$((W<<1) \& 1110_2)$—has a redundant mask, because shifting a word one place left will bring a zero bit into the low-order bit, and the low-order bit of the mask zeroes the same bit that was zeroed out by the associated shift. Thus, the second term can be simplified to $(W<<1)$. By removing such redundancy, Equation (13) becomes:

$W^i = (W<<2) \oplus (W<<1) \oplus (W \& 0011_2) \oplus$ $((W<<1) \& 0010_2) \oplus (W>>2) * 0001_2)$ (14)

The memory 105 can store the steps of a computer program to transform at least one of the plurality of first and second bit masks in the merged and combined plurality of bit equations into an associated one of a plurality of third bit masks comprising a sequence of zero bits and a sequence of one bits, when the at least one of the plurality of first and second bit masks is not comprised of a sequence of zero bits and a sequence of one bits. According to exemplary embodiments, in the following step of the computer program stored by the memory 105, masks can be replaced by shift operations. The replacement of these masks can be done more easily if the masks are "simple." As used herein, a "simple mask" is a bit mask that comprises a sequence of zero bits and a sequence of one bits, such as, for example, a sequence of zero bits followed by a sequence of one bits, or a sequence of one bits followed by a sequence of zero bits. In Equation (14), the masks $0011_2$ and $0001_2$ are of this form, but the mask $0010_2$ is not. The $0010_2$ mask can be transformed into two simple masks by noting that any value EXCLUSIVE-OR'ed with itself is equal to zero. Thus, two copies of any arbitrary term can be added into the EXCLUSIVE-OR chain of Equation (14) without affecting the overall value of the equation.

Consequently, for the step to transform bit masks, the memory 105 can store the steps of a computer program to add two copies of a first factor to the merged and combined plurality of bit equations using an EXCLUSIVE-OR operation between the two copies of the first factor and the merged and combined plurality of bit equations. The two copies of the first factor have the same shift distance as a second factor in the merged and combined plurality of bit equations, but a first or second bit mask associated with the second factor is not comprised of the sequence of zero bits and the sequence of one bits. Continuing with the present example, for Equation (14), it is advantageous to add two copies of the term $((W>>1) \& 0001_2)$, giving the equation:

$W^i = (W<<2) \oplus (W<<1) \oplus (W \& 0011_2) \oplus ((W>>1) \& 0010_2) \oplus$ $((W>>2) \& 0001_2) \oplus ((W>>1) \& 0001_2) \oplus ((W>>1) \& 0001_2)$ (15)

For the step to transform bit masks, the memory 105 can also store the steps of a computer program to merge one of the two copies of the first factor with the second factor by performing an OR operation between a bit mask associated with the one of the two copies of the first factor and the first or second bit mask associated with the second factor, to transform the first or second bit mask associated with the second factor into a third bit mask comprising the sequence of zero bits and the sequence of one bits. In the present example, the terms (($W$>>1) & $0010_2$) and (($W$>>1) & $0001_2$) in Equation (15) can be merged (using an OR operation) to give (($W$>>1) & $0011_2$), making the equation:

$$W^i = (W<<2) \oplus (W>>1) \oplus (W \& 0011_2) \oplus ((W>>1) \& 0011_2) \oplus$$

$$((W>>2) \& 0001_2) \oplus ((W>>1) \& 0001_2) \quad (16)$$

All of the masks in Equation (16) comprise of a series of zero bits and a series of one bits, i.e., they are all simple.

At this step, some redundant masks—masks that select bits which, from the preceding shift, are zero—could occur and the associated terms can be deleted. Consequently, for the step to transform bit masks, the memory 105 can also store the steps of a computer program to remove redundant first, second and third bit masks from the merged and combined plurality of bit equations. The redundant first, second and third bit masks zero the same bits as those zeroed by a shift associated with the first, second and third bit masks.

The memory 105 can store the steps of a computer program to replace the plurality of first, second and third bit masks with bit shift operations in the merged and combined plurality of bit equations, to form a function for generating the pseudo-random bit sequences. Continuing with the present example, consider the term (W & $0011_2$) in Equation (16). This is the original word with the top two bits cleared. The same result can be obtained by shifting the original word first left two places then right two places, so bringing in two zero bits at the high order. Thus, the term (W & $0011_2$) in Equation (16) can be implemented as (($W$<<2)>>2). Similarly, the term (($W$>>2) & $0001_2$) can be replaced by (($W$<<1)>>3), and so forth. Replacing all masks by shifts in Equation (16) results in:

$$W^i = (W<<2) \oplus (W<<2)>>2) \oplus ((W<<1)>>2) \oplus$$

$$((W<<1)>>3) \oplus ((W<<2)>>3) \quad (17)$$

Equation (17) is a function for generating the 3/2 PRBS of the present example.

However, additional optimizations can be performed on the resulting function to further reduce the number of operations required by the function to generate the PRBS. The memory 105 can store the steps of a computer program to determine at least one common factor in the function for generating the pseudo-random bit sequences, and to modify the function to express the function in terms of the at least one common factor. For example, Equation (17) can be regrouped as follows:

$$W^i = ((W<<2) \oplus (W<<1)) \oplus (((W<<2) \oplus (W<<1))>>2) \oplus$$

$$(((W<<2) \oplus (W<<1))>>3) \quad (18)$$

The factor (($W$<<2)$\oplus$($W$<<1)) in Equation (18) occurs three times, so an optimization is to pre-calculate this common factor, giving the following optimized function:

$$X = ((W<<2) \oplus (W<<1))$$

$$W^i = X \oplus (X>>2) \oplus (X>>3). \quad (19)$$

The memory 105 can store the steps of a computer program to generate the PRBS from the function for generating the PRBS. For example, using Equations (19), the 3/2 PRBS of the present example can be generated using the entire word length of the 4-bit processor of the present example.

To better illustrate the aforementioned steps of a computer program as stored by the memory 105, a function for generating a PRBS required by ITU recommendations will be described. The following example is for purposes of illustration and not limitation, as those of ordinary skill in the art will recognize that the steps described herein can be used with any processor word length to generate functions for generating any length of PRBS. For example, for extended shift register word lengths longer than the processor word length, a longer word can be emulated using two or more processor words.

In the following example, the resulting function can generate a PRBS formed from a 29-bit shift register with the EXCLUSIVE-OR feedback from stages 29 and 27 into stage 1 (i.e., a 29/27 PRBS). The 29/27 PRBS can be implemented using, for example, a 32-bit machine word, with 32 bits generated at once. In other words, the word length of the extended shift register is 32 bits and the predetermined number of iterations for generating the plurality of bit equations is 32 (i.e., W=32, the word length of the processor).

The single-step bit equations are calculated first. In other words, the length of a shift register is extended to form an extended shift register, each bit in the extended shift register is copied or otherwise shifted to a next higher bit, and the lowest-order bit of the extended shift register is replaced with an EXCLUSIVE-OR operation of at least two other bits in the extended shift register. As in the previous example, the first stage is the EXCLUSIVE-OR of the feedback stages (i.e., stages 27 and 29), and all other stages are shifted from the previous stage. The single-step bit equations are therefore:

$$B_1^i = B_{27} \oplus B_{29}$$

$$B_2^i = B_1$$

$$B_3^i = B_2$$

.

.

.

$$B_{27}^i = B_{26}$$

$$B_{28}^i = B_{27}$$

$$B_{29}^i = B_{28}$$

$$B_{30}^i = B_{29}$$

$$B_{31}^i = B_{30}$$

$$B_{32}^i = B_{31}$$

Next, the W-step bit equations are calculated. In other words, the plurality of bit equations are generated. The Equations (20) are iterated 32 times to give 32 individual bit equations, each of which gives the value of one PRBS bit after 32 iterations, in terms of the original contents of the extended shift register. Omitting intermediate steps, the resulting equations are:

$$B_1^{xxxii} = B_{23} \oplus B_{27}$$

$$B_2^{xxxii} = B_{24} \oplus B_{28}$$

$B_3{}^{xxxii}=B_{25}\oplus B_{29}$ $B_4{}^{xxxii}=B_1\oplus B_{26}\oplus B_{28}$ $B_5{}^{xxxii}=B_2\oplus B_{27}\oplus B_{29}$ $B_6{}^{xxxii}=B_1\oplus B_3$ $B_7{}^{xxxii}=B_2\oplus B_4$ $B_8{}^{xxxii}=B_3\oplus B_5$ $B_9{}^{xxxii}=B_{43}\oplus B_6$ $B_{10}{}^{xxxii}=B_5\oplus B_7$ $B_{11}{}^{xxxii}=B_6\oplus B_8$ $B_{12}{}^{xxxii}=B_7\oplus B_9$ $B_{13}{}^{xxxii}=B_8\oplus B_{10}$ $B_{14}{}^{xxxii}=B_9\oplus B_{11}$ $B_{15}{}^{xxxii}=B_{10}\oplus B_{12}$ $B_{16}{}^{xxxii}=B_{11}\oplus B_{13}$ $B_{17}{}^{xxxii}=B_{12}\oplus B_{14}$ $B_{18}{}^{xxxii}=B_{13}\oplus B_{15}$ $B_{19}{}^{xxxii}=B_{14}\oplus B_{16}$ $B_{20}{}^{xxxii}=B_{15}\oplus B_{17}$ $B_{21}{}^{xxxii}=B_{16}\oplus B_{18}$ $B_{22}{}^{xxxii}=B_{17}\oplus B_{19}$ $B_{23}{}^{xxxii}=B_{18}\oplus B_{20}$ $B_{24}{}^{xxxii}=B_{19}\oplus B_{21}$ $B_{25}{}^{xxxii}=B_{20}\oplus B_{22}$ $B_{26}{}^{xxxii}=B_{21}\oplus B_{23}$ $B_{27}{}^{xxxii}=B_{22}\oplus B_{24}$ $B_{28}{}^{xxxii}=B_{23}\oplus B_{25}$ $B_{29}{}^{xxxii}=B_{24}\oplus B_{26}$ $B_{30}{}^{xxxii}=B_{25}\oplus B_{27}$ $B_{31}{}^{xxxii}=B_{26}\oplus B_{28}$ $B_{32}{}^{xxxii}=B_{27}\oplus B_{29}$ (21)

Using Equations (21), each individual bit equation in Equations (21) is simulated within a word by a shift and bit mask, and then terms with the same shift distance are collected or otherwise grouped together. In other words, for each of the plurality of bit equations, a bit in the extended shift register is replaced with an AND operation between a shift of the contents of the extended shift register and one of a plurality of first bit masks. Each of the plurality of bit equations are combined using an EXCLUSIVE-OR operation, and shifts with the same shift distance are merged in the combined plurality of bit equations. The resulting equation is:

$$W^i=((W>>26)\&0x00000007)\oplus((W>>24)\& 0x00000018)\oplus$$

$$((W>>22)\&0x0000001F)\oplus((W>>3)\& 0xFFFFFF18)\oplus$$

$$((W>>22)\&0x0000001F)\oplus((W<<3)\&0xFFFFFFF8)\oplus$$

$$((W>>5)\&0xFFFFFFE0) \quad (22)$$

Redundant bit masks are then removed. In Equation (22), the bit masks in the terms ((W<<3) & 0xFFFFFFF8) and ((W<<5) & 0xFFFFFFE0) are redundant. Removing these bit masks results in:

$$W^i=((W>>26)\&0x00000007)\oplus(W>>24)\& 0x00000018)\oplus$$

$$((W>>22)\&0x0000001F)\oplus(W<<5) \quad (23)$$

To replace masks by shifts, the terms of Equation (23) should have simple masks, that is, masks that comprise a sequence of zero bits and a sequence of one bits. In other words, at least one of the plurality of first and second bit masks in the merged and combined plurality of bit equations is transformed into an associated one of a plurality of third bit masks comprising a sequence of zero bits and a sequence of one bits. The only term in Equation (23) that does not have a simple mask of this format is ((W>>24) & 0x00000018). Accordingly, the new term ((W>>24) & 0x00000007) can be applied twice to Equation (23), once merged with the original term and once as a new term, to give:

$$W^i=((W>>2\ 6)\&0x00000007)\oplus((W>>24)\& 0x0000001F)\oplus$$

$$((W>>22)\&0x0000001F)\oplus(W<<3)\oplus(W<<5)\oplus$$

$$((W>>24)\&0x00000007) \quad (24)$$

All of the remaining bit masks in Equation (24) are simple. Consequently, they can be replaced with bit shift operations, to give:

$$W^i=(W<<5)\oplus(W<<3)\oplus(W<<5)>>27)\oplus ((W<<3)>>27)\oplus$$

$$((W<<5)>>29)\oplus((W<<3)>>29) \quad (25)$$

Additionally, at least one common factor in Equation (25) can be determined. For example, the term (W<<5)⊕(W<<3) is used repeatedly in Equation (25). The function can be modified to express the function in terms of the at least one common factor. Accordingly, the terms of Equation (25) can be regrouped and factored to give the resulting function:

$$X=(W<<5)\oplus(W<<3)$$

$$W^i=(X>>27)\oplus(X>>29)\oplus X \quad (26)$$

Equation (26) can be used to generate the 29/27 PRBS by taking advantage of the entire word length of the 32-bit processor of the present example. Thus, 32 iterations of the original hardware algorithm, with each iteration consisting of 31 bit shifts and one two-bit EXCLUSIVE-OR, has been reduced to an function consisting of seven word length operations—three EXCLUSIVE-ORs and four shifts. With the seven operation function of Equation (26) of the present example, if each operation takes one machine cycle, the processing cost is less than a quarter of a cycle per bit for the 32-bit processor of the present example.

Exemplary embodiments of the present invention can be used to generate functions for generating other ITU-recommended PRBSs. For example, for a 32-bit processor, the resulting function for generating a 31/28 PRBS is:

$$X=(W<<4) \oplus (W<<1)$$

$$W^i=(X>>28) \oplus (X>>31) \oplus X \qquad (27)$$

The resulting function for generating a 23/18 PRBS is:

$$X=(W<<14) \oplus (W<<9)$$

$$W^i=(X>>18) \oplus (X>>23) \oplus X \qquad (28)$$

The resulting function for generating a 20/17 PRBS is:

$$X=(W<<15) \oplus (W<<12)$$

$$W^i=(X>>17) \oplus (X>>20) \oplus X \qquad (29)$$

The resulting function for generating a 20/3 PRBS is:

$$X=(W<<29) \oplus (W<<12)$$

$$W^i=(X>>3) \oplus (X>>6) \oplus (X>>9) \oplus (X>>12) \oplus (X>>15) \oplus$$

$$(X>>18) \oplus (X>>20) \oplus (X>>21) \oplus (X>>24) \oplus$$

$$(X>>26) \oplus (X>>27) \oplus (X>>30) \oplus X \qquad (30)$$

The resulting function for generating a 15/14 PRBS is:

$$X=(W<<18) \oplus (W<<17)$$

$$W^i=(X>>14) \oplus (X>>15) \oplus (X>>28) \oplus (X>>30) \oplus X \qquad (31)$$

The resulting function for generating a 11/9 PRBS is:

$$X=(W<<23)>(W<<21)$$

$$W^i=(X>>9) \oplus (X>>11) \oplus (X>>18) \oplus (X>>22) \oplus$$

$$(X>>27) \oplus (X>>29) \oplus (X>>31) \oplus X \qquad (32)$$

The resulting function for generating a 9/5 PRBS is:

$$X=(W<<27) \oplus (W<<23)$$

$$W^i=(X>>5) \oplus (X>>9) \oplus (X>>10) \oplus (X>>15) \oplus (X>>18) \oplus$$

$$(X>>19) \oplus (X>>20) \oplus (X>>23) \oplus (X>>25) \oplus$$

$$(X>>27) \oplus (X>>29) \oplus (X>>30) \oplus X \qquad (33)$$

The automatically-produced functions for generating the 31/28, 29/27, 23/18 and 20/17 PRBSs for generating 32 bits at once each reduce to seven operations: four shifts and three EXCLUSIVE-OR operations. The automatically-produced function for generating the 32 bit algorithm for the 20/3 PRBS given in Equation (30) uses 27 operations: 14 shift and 13 EXCLUSIVE-OR operation. Even when a shift and an EXCLUSIVE-OR can be combined into a single operation, as on, for example, the IXP1200 network processor, the operation count is still 15. The number of operations can be reduced by exploiting the regularity in the shift distances in the second step of Equation (30), as follows (where the term "X" in the original formulation of Equation (30) has been replaced by the equivalent "X>>0"):

$$W^i=(X>>0) \oplus (X>>3) \oplus (X>>6) \oplus (X>>9) \oplus (X>>12) \oplus$$

$$(X>>15) \oplus (X>>18) \oplus (X>>20) \oplus (X>>21) \oplus (X>>24) \oplus$$

$$(X>>26) \oplus (X>>27) \oplus (X>>30) \qquad (34)$$

The shift distances in Equation (34) are 0, 3, 6, 9, 12, 15, 18, 20, 21, 24, 26, 27 and 30, respectively.

Shifts in the same direction are cumulative, that is, right shifting a value, for example, six places then right shifting the result three places has the same overall effect as shifting the original value nine places. When a series of terms are EXCLUSIVE-OR'ed together, order does not matter. Therefore, the pair of terms $(X>>6) \oplus (X>>9)$ can be replaced by the complex term $((X>>0) \oplus (X>>3))>>6$. Similarly, the pair of terms $(X>>12) \oplus (X>>15)$ can be recast as $((X>>0) \oplus (X>>3))>>12$. Other term pairs with shift distances differing by three are readily apparent, (0–3, 18–21, 24–27) and can be recast similarly.

The sub-expression $((X>>0) \oplus (X>>3))$ occurs in several of the recast term pairs, and so it can be factored out. Doing so results in the further optimized function:

$$X=(W<<29) \oplus (W<<12)$$

$$Y=(X) \oplus (X>>3)$$

$$W^i=(Y) \oplus (Y>>6) \oplus (Y>>12) \oplus (Y>>18) \oplus (X>>20) \oplus$$

$$(Y>>24) \oplus (X>>26) \oplus (X>>30) \qquad (35)$$

Equations (35) have an operation count of 19 (10 shift, 9 EXCLUSIVE-ORs), compared with 27 of the original functions of Equation (30). Other groupings are possible and can provide even better optimization. For example:

$$X=(W<<29) \oplus (W<<12)$$

$$Y=(X) \oplus (X>>6)$$

$$W^i=(Y) \oplus (Y>>3) \oplus (Y>>12) \oplus (Y>>15) \oplus$$

$$(Y>>20) \oplus (Y>>24) \oplus (X>>27) \qquad (36)$$

Equations (36) reduce the operation count to 17 (9 shift, 8 EXCLUSIVE-OR). Performing a second grouping on Equations (36) gives:

$$X=(W<<29) \oplus (W<<12)$$

$$Y=(X) \oplus (X>>6)$$

$$Z=(Y) \oplus (Y>>3)$$

$$W^i=(Z) \oplus (Z>>12) \oplus (Y>>20) \oplus (Y>>24) \oplus (X>>27) \qquad (37)$$

Equations (37) have an operation count of 15 (8 shift, 7 EXCLUSIVE-OR). For the last term in Equation (37), $(X>>27)$, the term can be replaced by $(X>>27) \oplus (X>>33)$, because $(X>>33)$ is axiomatically zero (any shift longer than the word length produces an all zero result). The pair $(X>>27) \oplus (X>>33)$ have shifts differing by six, so the pair can be replaced by $(Y>>27)$. This term, in turn, can be combined with the term (Y>>24) and the pair replaced by (Z>>24). The further optimized function is thus:

$$X=(W<<29)\oplus(W<<12)$$

$$Y=(X)\oplus(X>>6)$$

$$Z=(Y)\oplus(Y>>3)$$

$$W^i=(Z)\oplus(Z>>12)\oplus(Y>>20)\oplus(Z>>24) \quad (38)$$

Equations (38) reduce the operation count to 13 (7 shift, 6 EXCLUSIVE-OR), which is less than half of the original automatically-produced function for the 20/3 PRBS of Equation (30).

The automatically-produced function for generating the 11/9 PRBS given by Equations (32), slightly recast, is:

$$X=(W<<23)\oplus(W<<21)$$

$$W^i=(X>>0)\oplus(X>>9)\oplus(X>>11)\oplus(X>>18)\oplus$$

$$(X>>22)\oplus(X>>27)\oplus(X>>29)\oplus(X>>31) \quad (39)$$

Equations (39) require 17 operations (9 shifts, 8 EXCLUSIVE-OR). Following the same methodology of grouping terms as used for the 20/3 PRBS, the following equivalent 11 operation (6 shift, 5 EXCLUSIVE-OR) function emerges for the 11/9 PRBS:

$$X=(W<<23)\oplus(W<<21)$$

$$Y=(X)\oplus(X>>18)$$

$$Z=(Y)\oplus(Y>>22)$$

$$W^i=(Z)\oplus(Z>>9)\oplus(Z>>11) \quad (40)$$

The automatically-produced function for generating the 9/5 PRBS given by Equations (33), slightly recast, is:

$$X=(W<<27)\oplus(W<<23)$$

$$W^i=(X>>0)\oplus(X>>5)\oplus(X>>9)\oplus(X>>10)\oplus(X>>15)\oplus$$

$$(X>>18)\oplus(X>>19)\oplus(X>>20)\oplus(X>>23)\oplus(X>>25)\oplus$$

$$(X>>27)\oplus(X>>29)\oplus(X>>30) \quad (41)$$

Equations (41) require 27 operations (14 shifts, 13 EXCLUSIVE-OR). An exemplary optimized function is:

$$X=(W<<27)\oplus(W<<23)$$

$$Y=(X)\oplus(X>>5)\oplus(X>>9)$$

$$Z=(Y)\oplus(Y>>20)$$

$$W^i=(Z)\oplus(Z>>10)\oplus(Z>>18) \quad (42)$$

Equations (42) require 13 operations (7 shifts, 6 EXCLUSIVE-OR). Further optimizations are possible. Those of ordinary skill in the art will recognize that the aforementioned methodologies can be applied to any function for generating any type of PRBSs using any processor of any word length.

The memory 105 can also store the steps of a computer program to seed the extended shift register with an initial seeding value. In general, PRBS generators have the property that if at any time all of the stages of the unextended shift register contain zero, then they will always contain zero. Therefore, the extended shift register can be initialized with a non-zero value. However, this still can lead to a transient condition at startup where an unexpected bit sequence can occur. For example, consider the 15/14 PRBS generator. In the typical hardware implementation, the 15/14 PRBS is generated by a 15-bit shift register, with some feedback. Consequently, there are $2^{15}$ possible states that the shift register can be in. However, the 32 bit processor shift register can be in any of $2^{32}$ possible states. Most of these will not correspond to sequences that could have come from the 15-bit hardware generator. This situation is, however, transient. After the extended bits (i.e., those bits of the extended shift register that do not correspond to the original, shorter shift register) have been consumed by the output, all subsequent bits will be valid. However, it is preferable to avoid this transient situation.

To avoid this possible transient situation, the seed can be placed in the low order bits of the extended shift register, then running sufficient iterations of a simulation of just one step of the basic (hardware) algorithm to bring these bits to the top of the register. The seed that can be used can be the same seed that is used for existing hardware PRBS generators. For example, for the 20/3 PRBS pattern, the 32-bit processor shift register can be pre-loaded with the seed for the 20/3 PRBS generator in its low 20 bits (as the upper 12 bits do not matter). Twelve iterations of a simulation of the basic hardware algorithm would then be run. The initial 20 bits are then shifted to the top of the register, and the next 12 bits can be calculated and left in the low end of the register. The register is then ready for use, and the function for generating PRBSs, produced according to exemplary embodiments of the present invention, can be used to get successive words (e.g., 32 bits) of the PRBS sequence at a time. The seed for the hardware shift register is usually known at compile time, so the simulation of the initial few iterations can be done, for example, off-line, producing a 32 bit value that can be used to seed the 32 bit register so as to produce the correct sequence. For different processor word lengths, other seed values appropriate for the given processor word length can be used.

Exemplary embodiments of the present invention can generate functions for generating PRBSs, producing very efficient software implementations of, for example, the PRBS types recommended by the ITU. Nevertheless, with fast communications links, it may still not be possible for a modest processor to be able to generate PRBS bits fast enough to keep the communications link filled. For example, the worst case 20/3 PRBS function requires 27 operations. Assuming that one operation takes one machine cycle and that there is no overhead, this results in 32/27 PRBS bits being generated per cycle. With a 200 MHz processor, this equates to approximately 237 PRBS bits per second. In practice, control and I/O overhead will reduce this further. Communications links can run at several gigabits per second, so there may still be a performance gap.

To address this problem, exemplary embodiments of the present invention can use more than one processor 110 to generate the PRBS. Thus, the system 100 can also include at least a second processor 115 for accessing the memory 105 to execute the computer program. The system 100 can, however, include any number of additional processors 120. Accordingly, the memory 105 can store the steps of a computer program to generate a sequence of a plurality of pseudo-random bit sequences. Each of the processors can produce a portion of the sequence of the plurality of pseudo-random bit sequences. According to this exemplary embodiment, to generate the plurality of bit equations, the predetermined number of iterations can be a multiple of the word length of the extended shift register.

To produce a portion of the sequence of the plurality of PRBSs, the memory 105 can store the steps of a computer program to produce a first sequence of the plurality of pseudo-random bit sequences using the function for generating pseudo-random bit sequences, and to skip a second sequence of the plurality of pseudo-random bit sequences using a function for skipping a sequence of a plurality pseudo-random bit sequences. In other words, if there are P processors, each processor generates N sequential PRBS words, where N can be chosen to be greater than one. The memory 105 can also store the steps of a computer program to skip a second sequence of the plurality of pseudo-random bit sequences using a function for skipping a sequence of a plurality pseudo-random bit sequences. In other words, N*(P−1) sequential PRBS words can be skipped. The process can then be repeated.

To generate the function for skipping the sequence of the plurality of PRBSs, the memory 105 can store the steps of a computer program to iterate the step to generate the plurality of bit equations over the multiple of the length of the extended shift register. In other words, the skipping function can be generated using the same methodology used to create the word-at-once PRBS generating functions. The second step of that methodology is to generate the W-step bit equations by iterating the single-step bit equations a number of times equal to the word size to give a set of bit equations defining each bit in terms of EXCLUSIVE-ORs of the original bits. However, by iterating the bit equations many times, bit equations defining each bit of the output word many iterations in the future can be obtained without generating all of the intermediate bits. This set of bit equations can then be turned into shift/mask operations and be simplified, according to the manner discussed previously. The outputs of the several processors can then be interleaved, so that the composite sequence forms the desired PRBS. Thus, the memory 105 can store the steps of a computer program to interleave the portions of the sequence of the plurality of pseudo-random bit sequences from each of the processors to generate the sequence of the plurality of pseudo-random bit sequences.

Additionally, each processor can be seeded with an initial value appropriate to the position of that processor's output in the interleaved sequence. Thus, the memory 105 can also store the steps of a computer program to seed the extended shift register associated with each of the processors with an initial seeding value associated with a position of the portion of the sequence of the plurality of pseudo-random bit sequences of each processor in the interleaved sequence. According to the present exemplary embodiment, the processors 110, 115, and 120 can be chosen so that the processor time taken to skip N*(P−1) sequential PRBS words is less than the processor time taken to generate each of the PRBS words in turn.

For purposes of illustration and not limitation, the following example illustrates the production of functions for generating sequences of PRBSs using multiple processors. In the present example, two 32-bit processors are used for generating a 31/28 PRBS. However, those of ordinary skill will recognize that processors of any word length and any numbers of processors can be used for generating PRBSs using the functions produced according to exemplary embodiments. In the present example, PRBS bits are generated in batches of 16 words, where each word is 32 bits. Accordingly, the equivalent number of iterations of the basic hardware algorithm can also be skipped. To do so, the same methodology used to generate functions for generating PRBSs can be used to generate the skipping function.

However, for the skipping function, instead of generating the W-step bit equations by iterating the single-step bit equations 32 times, a set of generation skipping equations is generated by iterating the single-step equations (16 words)* (32 bits/word)=512 times.

Applying the same methodology as discussed previously, the function for advancing the PRBS by 512 bits is as follows:

$$X=(W\!<\!<\!4)\oplus(W\!<\!<\!1)$$

$$W^{nxvi}=(W\!<\!<\!16)\oplus(W\!<\!<\!8)\oplus(W\!<\!<\!2)\oplus$$

$$(X\!>\!>\!16)\oplus(X\!>\!>\!24)\oplus(X\!>\!>\!30) \qquad (43)$$

The function for generating a single word of this PRBS was earlier derived in Equation (27) as:

$$X=(W\!<\!<\!4)\oplus(W\!<\!<\!1)$$

$$W^i=(X\!>\!>\!28)\oplus(X\!>\!>\!31)\oplus X \qquad (44)$$

At 13 operations, the skipping algorithm is much faster than 16 iterations, each of 7 operations, of the single word function. Thus, skipping PRBS bits is quicker than calculating them for multiple processors. Consequently, for the present example, the overall function for the first processor can be implemented in pseudo-code as, for example:

```
word = PRBS_31_28_SEED                                    (45)
forever
{
    do (16 times)
    {
        output (word)
        X = (word << 4) ⊕ (word << 1)
        word = (X >> 28) ⊕ (X >> 31) ⊕ X
    }
    X = (word << 4) ⊕ (word << 1)
    word = (word << 16) ⊕ (word << 8) ⊕ (word << 2) ⊕
        (X >> 16) ⊕ (X >> 24) ⊕ (X >> 30)
}
```

For the second processor, the overall function can be implemented in pseudo-code as, for example:

```
word = PRBS_31_28_SEED                                    (46)
X = (W << 4) ⊕ (W << 1)
word = (word << 16) ⊕ (word << 8) ⊕ (word << 2) ⊕
    (X >> 16) ⊕ (X >> 24) ⊕ (X >> 30)
forever
{
    do (16 times)
    {
        output (word)
        X = (word << 4) ⊕ (word << 1)
        word = (X >> 28) ⊕ (X >> 31) ⊕ X
    }
    X = (word << 4) ⊕ (word << 1)
    word = (word << 16) ⊕ (word << 8) ⊕ (word << 2) ⊕
        (X >> 16) ⊕ (X >> 24) ⊕ (X >> 30)
}
```

In Equations (45) and (46), the seed value of PRBS_31_ 28_SEED is the same seed that is used for existing hardware PRBS generators for the 31/28 PRBS. In the present example, skilled artisans will recognize that the pseudo-code examples of Equations (45) and (46) can be modified to include the control logic used to properly interleave the two PRBS sub-streams to give the full output stream.

The two-processor example resulting in Equations (45) and (46) can generate PRBS bits at up to twice the rate of a single processor. However, the additional overhead of merging the sub-streams and ensuring that the processors remain synchronize may reduce the gain to less than two. Consequently, the present example can be modified to use, for example, 16 processor threads. The 16 processor threads can be implemented on, for example, four processors, each running four independent threads, to allow I/O and synchronization in one thread to overlap processing in another, thus obtaining efficient use of the processor. Those of ordinary skill will recognize that any number of processor threads implemented on any number of processors can also be used according to exemplary embodiments of the present invention.

As in the previous non-multi-threaded example, each processor thread can generate batches of 16 words (512 bits) of the PRBS. Each processor thread can then skip the PRBS bits that the other processor threads generate. With 15 other processor threads, each thread generating 16 words, the skip is 240 words (7,680 bits). Using the 31/28 PRBS as an example, the function for skipping 7,680 bits is:

$$X=(W<<1)\oplus(W<<4)$$

$$W=(W<<30)\oplus(W<<27)\oplus(W<<25)\oplus(W<<23)\oplus(W<<21)\oplus$$

$$(W<<20)\oplus(W<<19)\oplus(W<<18)\oplus(W<<17)\oplus(W<<16)\oplus$$

$$(W<<15)\oplus(W<<12)\oplus(W<<10)\oplus(W<<8)\oplus(W<<6)\oplus$$

$$(W<<5)\oplus(W<<3)\oplus(W<<2)\oplus(X>>2)\oplus(X>>5)\oplus$$

$$(X>>7)\oplus(X>>9)\oplus(X>>11)\oplus(X>>12)\oplus(X>>13)\oplus$$

$$(X>>14)\oplus(X>>15)\oplus(X>>16)\oplus(X>>17)\oplus(X>>20)\oplus$$

$$(X>>22)\oplus(X>>24)\oplus(X>>26)\oplus(X>>27)\oplus(X>>29)\oplus$$

$$(X>>31)\oplus(W<<1) \tag{47}$$

The equation for W in Equation (47) is quite complex and, therefore, may be slow, although still faster than the equivalent 240 iteration of the word-at-a-time algorithm. Empirically, the generated PRBS bit-skipping functions can be shorter (and hence faster) when the number of bits skipped is a power of two. For example, the function for skipping 8,192 bits of the 31/28 PRBS is:

$$X=(W<<4)\oplus(W<<1)$$

$$W=(W<<16)\oplus(W<<8)\oplus(X>>16)\oplus(X>>24)\oplus$$

$$(X>>28)\oplus(W<<4) \tag{48}$$

The equation for W in Equation (48) is simpler than the equation for W in Equation (47). The function for each processor can be modified to take advantage of this efficiency.

As discussed previously, the methodology for multiple processors is to: i.) generate N sequential PRBS words, where N can be chosen to be greater than 1; ii.) skip N*(P−1) sequential PRBS words; and iii.) repeat from the start. This methodology can be modified, then, in the following manner to make the skip length a power of two. The memory 105 can store the steps of a computer program to store a current sequence of the plurality of pseudo-random bit sequences before producing the first sequence of the plurality of pseudo-random bit sequences. Thus, the current PRBS word is stored. The N sequential PRBS words can then be generated. The memory 105 can store the steps of a computer program to restore the current sequence before skipping the second sequence. Thus, the stored PRBS word can be restored. For the step to skip the second sequence, a skip length for the second sequence comprises a length of the sequence of the plurality of pseudo-random bit sequences generated by the processors to make the skip length a power of two. In other words, N*P sequential PRBS words can be skipped, and then the process can be repeated from the start. Consequently, each processor thread can generate a batch of PRBS bits, then goes back to where it started and skips one complete cycle of all the PRBS bits generated by all the processor threads—including itself—in one iteration of each outer loop. Stepping back before skipping can reduce the size of the skipping code by making the skip length a power of two.

With the modified methodology applied to the present example, the function for each processor thread (which are assumed to be indexed from 0 to 15) can be implemented as pseudo-code, for example:

```
word = PRBS_31_28_SEED                              (49)
do (thread index times)
{
    X = (W << 4) ⊕ (W << 1)
    word = (word << 16) ⊕ (word << 8) ⊕ (word << 2) ⊕
        (X >> 16) ⊕ (X >> 24) ⊕ (X >> 30)
}
forever
{
    orig = word
    do (16 times)
    {
        output (word)
        X = (word << 4) ⊕ (word << 1)
        word = (X >> 28) ⊕ (X >> 31) ⊕ X
    }
    X = (orig << 4) ⊕ (orig << 1)
    word = (orig << 16) ⊕ (orig << 8) ⊕ (X >> 16) ⊕
        (X >> 24) ⊕ (X >> 28) ⊕ (orig << 4)
}
```

Skilled artisans will recognize that the pseudo-code of Equations (49) can be modified to include the logic for synchronizing between threads.

The function, produced according to the aforementioned methodology, for skipping 512 iterations of the 15/14 PRBS is as follows:

$$X=(W<<17)\oplus(W<<18)$$

$$W=(W<<22)\oplus(W<<21)\oplus(W<<20)\oplus(W<<19)\oplus X\oplus(X>>10)\oplus$$

$$(X>>11)\oplus(X>>12)\oplus(X>>13)\oplus(X>>14)\oplus(X>>15)\oplus$$

$$(X>>24)\oplus(X>>30) \tag{50}$$

A common factor, X, can be calculated from the current PRBS word, W. The skipped PRBS word can then be calculated in terms of both the common factor and the current PRBS word. For some processors, however, it may be convenient to recast the calculation in terms of the common factor only. This can be done by repeatedly applying the following sequence. First, assume there is a common factor X derived from $(W<<i)\oplus(W<<j)$, where i is less than j. Then, replace each term of the form $(W<<n)$, where n is greater than or equal to i, by the pair of terms $(X<<(n-i))\oplus(W<<(j+n-i))$. This is equivalent, because, by the definition of X, the pair of terms is equivalent to:

$$((W<<i)\oplus(W<<j))<<(n-i)\oplus(W<<(j+n-i)) \quad (51)$$

The second and third terms of Equation (51) cancel, so the sub-expression simplifies to $(W<<n)$. If $(j+n-i)$ is greater than or equal to the word size, then the value of $(W<<(j+n-i))$ is zero, so this introduced term can be dropped. Otherwise the new term of the form $(W<<n)$ is subject to the same replacement. Thus, the memory 105 can store the steps of a computer program to modify the function for skipping the sequence of the plurality pseudo-random bit sequences to express the function in terms of a common factor. This methodology can be iterated until there are no more terms of the form $(W<<n)$ remaining, at which point the skipped PRBS is expressed only in terms of the common factor. There may be duplicate terms: two terms that are equal shifts of the common factor. Any value EXCLUSIVE OR'ed with itself is zero, so such duplicate pairs can be eliminated. Thus, the memory 105 can store the steps of a computer program to eliminate pairs of common factors that include the same shift distance. Applying this methodology to the 512 iteration skip function for the 15/14 PRBS of Equation (50) produces:

$$X=(W<<17)\oplus(W<<18)$$

$$W=(X<<2)\oplus X\oplus(X>>10)\oplus(X>>11)\oplus(X>>12)\oplus(X>>13)\oplus$$

$$(X>>14)\oplus(X>>15)\oplus(X>>24)\oplus(X>>30)\oplus(X<<4) \quad (52)$$

In this case, the reformulated function of Equation (52) is slightly shorter than Equation (50). Although this may not be true for all PRBS functions, both implementations can be generated and the shorter resulting function can be selected. However, where the function is expressed in terms of one factor, the reformulated methodology can produce the shorter function.

The QRBS (Quasi Random Bit Sequence) is defined in ITU recommendations. The QRBS is the 20/17 PRBS with its output modified so that there are no continuous sequences of more than 14 zero bits. Whenever the PRBS generator produces a sequence of 15 zero bits, the first bit in that sequence is changed to a one before the sequence is passed on. The bit is changed only at the output of the entire QRBS generator, not in the shift register of the core 20/17 PRBS generator. The QRBS generator can thus be implemented as a 20/17 PRBS generator followed by a filter. The function produced for generating, for example, 32 bits of the 20/17 PRBS at once has been discussed previously. For the filtering, the ITU recommendations state that the QRBS output should contain no sequences of more than 14 successive zero bits. Thus: i.) a sequence of 14 successive zeroes (followed by a one) from the PRBS should be unchanged; ii.) a sequence of 15 successive zeroes (followed by a one) from the PRBS should have the first zero changed to a one; iii.) a sequence of 16 successive zeroes (followed by a one) from the PRBS should have the first two zeroes changed to ones; and iv.) a sequence of 14+n successive zeroes (followed by a one) from the PRBS should have the first n zeroes changed to ones.

Consequently, whenever 14 successive zeroes are detected in the PRBS output, the bit that precedes the sequence should be set to one (if the bit is already one, then there is no change). Thus, the memory 105 can store the steps of a computer program to determine whether there are a predetermined number of successive zeroes in the generated pseudo-random bit sequence, and to set a bit to one in the generated pseudo-random bit sequence, where the bit precedes the predetermined number of successive zeroes, when it is determined that there are a predetermined number of successive zeroes in the generated pseudo-random bit sequence. According to an exemplary embodiment, the predetermined number of successive zeroes can be fourteen. However, those of ordinary skill will recognize that the predetermined number of successive zeroes can be any number of successive zeroes.

The situation is, however, more complex when the PRBS is generated with, for example, 32 bits or more at once. In such situations, the possible sequence of 15 or more zero bits may have any alignment within the, for example, 32 bits, all of which are to be detected. However, the sequence may span two successive 32 bit words, which means that the final value of the current word cannot be determined until the next PRBS word is available. According to exemplary embodiments of the present invention, for such situations, at least two pseudo-random bit sequences can be generated from the function for generating the pseudo-random bit sequences. The memory 105 can store the steps of a computer program to concatenate the at least two generated pseudo-random bit sequences. For each bit in the first of the at least two concatenated pseudo-random bit sequences, the memory 105 can store the steps of a computer program to determine whether a predetermined number of successive bits following the bit are zero. When it is determined that the bit is followed by the predetermined number of successive zero bits, the memory 105 can store the steps of a computer program to create a bit mask that isolates the bit and perform an OR operation between the bit mask that isolates the bit and the first of the at least two concatenated pseudo-random bit sequences to change the bit to a one. According to exemplary embodiments, the predetermined number of successive bits can be fourteen. However, those of ordinary skill will recognize that the predetermined number of successive zeroes can be any number of successive zeroes.

Thus, according to exemplary embodiments of the present invention, for the example of a 32-bit processor, two 32-bit PRBS words can be generated and concatenated together to make a 64 bit value. For each bit in the first 32 bits of the 64-bit PRBS double word, a test can be made to determine whether the next 14 bits are all zero, and a bit mask can be created to indicate where this is true. An INCLUSIVE-OR operation can be performed between the created bit mask and the PRBS word to give the QRBS output word. Those of ordinary skill in the art will recognize that the aforementioned methodology can be used with any number of processors of any word length.

An exemplary pseudo-code implementation of this methodology is, for example (where "+" represents an INCLUSIVE-OR operation and "~" represents a bit-wise negation operation):

$$
\begin{aligned}
&W^i = \text{PRBS\_20\_17} \; [\text{the PRBS word of interest}] \quad (53)\\
&W^{ii} = \text{PRBS\_20\_17} \; [\text{the next PRBS word}]\\
&DW = [W^i,W^{ii}] \quad [\text{concatenation to a 64 bit double word}]\\
&NZ = (DW << 1) + (DW << 2) +\\
&\quad\quad (DW << 3) + \cdots + (DW << 13) + (DW << 14)\\
&\quad\quad [\text{search for one bits}]\\
&Q = W^i + {\sim}NZ \; [\text{force a one where no one bit seen in the next fourteen bits}]
\end{aligned}
$$

Equations (54) use two iterations of the core PRBS function at seven operations each, plus 14 double length shifts and 14 INCLUSIVE-ORs, for at least 42 operations. However, Equations (53) can be optimized further by, for example, working in two passes. On the first pass, the upper half of the current PRBS word can be processed. For the bits in the upper half of the current PRBS word, the subsequent 14 bits are all in the same word, so they can be processed without examining the next PRBS word. On the second pass, the lower 16 bits of the current PRBS word can be processed by concatenating the half-word with the upper 16 bits of next PRBS word. By working in two passes, shifts on double length (in the present example, 64 bit) words do not need to be performed.

Consequently, Equations (53) can be modified by eliminating the double word operations by working in two passes, where the first pass processes the upper part of the current PRBS word and the second pass processes the lower part of the current PRBS word. An exemplary pseudo-code implementation of this methodology is, for example:

```
PASS 1:                                                     (54)
W^i = PRBS_20_17 [the PRBS word of interest]
NZ = (W^i << 1) + (W^i << 2) + (W^i << 3) + ... + (W^i << 14)
    [search for one bits]
W^i = W^i + ~NZ   [force a one where no one bit seen in
the next fourteen bits]
PASS 2:
W^ii = PRBS_20_17         [the next PRBS word]
W = (W^i << 16) + (W^ii >> 16) [lower 16 bits of this word and
                                upper 16 bits of next word]
NZ = (W << 1) + (W << 2) + (W << 3) + ... + (W << 14) [search
for one bits]
W^i = W^i + (~NZ >> 16)   [force a one as necessary in the low
order bits]
```

The second pass of Equations (54) starts by calculating the next PRBS word. For the second pass of Equations (54), however, only the upper 14 bits of the next PRBS word are needed. Consequently, a full calculation of all 32 bits of the next PRBS word is not necessary, as only the upper 14 bits of that word can affect the output. Therefore, only the upper 14 bits of the next PRBS word need be calculated. With this modification, the 20/17 PRBS function becomes:

$$X = (W << 15) \oplus (W << 12)$$

$$W^i = (X >> 17) \oplus (X >> 20) \oplus X \quad (55)$$

For the term (X>>17) in the second statement of Equations (55), the value of this term will have zero in the upper 17 bits. Therefore, this term does not contribute to the top 14 bits of the next PRBS word. Similarly, the term (X>>20) will be zero in the top 20 bits, so the term also does not contribute to the top 14 bits of the next PRBS word. This leaves the term X. A simplified function that generates the top 14 (actually 17) bits of the next PRBS word is:

$$W^i = (W << 15) \oplus (W << 12) \quad (56)$$

Applying Equation (56) to Equations (54) yields the following optimized functions, as expressed in pseudo-code:

```
PASS 1:                                                     (57)
W^i = PRBS_20_17
NZ = (W^i << 1) + (W^i << 2) + (W^i << 3) ... + (W^i << 14)
W^i = W^i + ~NZ
```

-continued

```
PASS 2:
W^ii = (W^i << 15) ⊕ (W^i << 12)
W = (W^i << 16) + (W^ii >> 16)
NZ = (W << 1) + (W << 2) + (W << 3) ... (W << 14)
W^i = W^i + (~NZ >> 16)
```

Sequences of fourteen or more successive zeroes in the PRBS output may be rare. For example, most 32 bits words from the 20/17 PRBS may not contain any sequence of 15 or more zeroes. Therefore, a fast test can be performed for detecting sequences of fourteen or more successive zeroes and skipping the shift chain when not found. In the present example of a 32-bit processor, first consider the 32 bit value as four bytes, as shown in TABLE 1:

TABLE 1

| | Byte | | | |
|---|---|---|---|---|
| | 4 | 3 | 2 | 1 |
| Value | 0–255 | 0–255 | 0–255 | 0–255 |

Next, force the high order bit of each byte to zero, as shown in TABLE 2:

TABLE 2

| | Byte | | | |
|---|---|---|---|---|
| | 4 | 3 | 2 | 1 |
| Value | 0 to 127 | 0 to 127 | 0 to 127 | 0 to 127 |

Next, subtract 1 from each byte, as shown in TABLE 3:

TABLE 3

| | Bits | | | |
|---|---|---|---|---|
| | 32 to 25 | 24 to 17 | 16 to 9 | 8 to 1 |
| Value | −1 to 126 | −1 to 126 | −1 to 126 | −1 to 126 |

Then, the lowest order byte will be −1 if and only if the value before subtraction was zero. That is, the low 7 bits of the original byte were all zero. If the byte is negative after the subtraction, then its high order bit is set (using two's complement arithmetic). If the high order bit of the low order byte (i.e., bit 8) is set, then the low order 7 bits of the word must originally have been zero. Conversely, if, after the subtraction, bit 8 is not set, then at least one bit was set in the lower order seven bits of the original word. A similar reasoning applies to the next lowest order byte. Assuming there is no carry out from the lowest byte (i.e., there was at least one set bit in the low seven bits of the original word), then bit 16 after the subtraction will be set if and only if bits 15 to 9 were all zero before the subtraction. The same applies to the upper two bytes.

When all four subtractions are considered in totality, if bits 8, 16, 24 and 32 are all zero after the subtractions, then the original word has at least one set bit in each of the bit ranges (1 . . . 7), (9 . . . 15), (17 . . . 23), and (25 . . . 31). If there is at least one bit set in each of these ranges, there can be no sequence of fifteen zero bits in the entire word. At most, there can be a sequence of 13 zeroes (the low six bits of one byte and the high seven bits of the next). The converse is, however, not necessarily true: even if one of the four bit ranges is zero, it does not necessarily mean that there is a run of 15 zeroes within the word. However, the fast test according to exemplary embodiments can be used to eliminate most words that do not contain 15 or more successive zeroes. Empirically, approximately 95% of the words from the 32-bit 20/17 PRBS generator can be eliminated by this fast test, leaving approximately 5% needing closer scrutiny.

The aforementioned fast test can be expressed, for example, in pseudo-code as:

```
X = W & 0x7F7F7F7F                              (58)
Y = X − 0x01010101       [four subtractions in parallel]
if all zero in (Y & 0x80808080)
then
{
    there are no runs of 15 successive zero bits in W
}
```

Applying Equations (58) to both passes of Equations (57) gives:

```
PASS 1:                                          (59)
    Wⁱ = PRBS_20_17
    X = Wⁱ & 0x7F7F7F7F
    Y = X − 0x01010101
    if any bit set in (Y & 0x80808080)
    then
    {
        NZ = (Wⁱ << 1) + (Wⁱ << 2) +
             (Wⁱ << 3) + ...+ (Wⁱ << 14)
        Wⁱ = Wⁱ + ~NZ
    }
PASS 2:
    Wⁱⁱ = (Wⁱ << 15) ⊕ (Wⁱ << 12)
    W = (Wⁱ << 16) + (Wⁱⁱ >> 16)
    X = W & 0x7F7F7F7F
    Y = X − 0x01010101
    if any bit set in (Y & 0x80808080)
    then
    {
        NZ = (W << 1) + (W << 2) +
             (W << 3) + ... + (W << 14)
        Wⁱ = Wⁱ + (~NZ >> 16)
    }
```

Assuming that the "if" is false for 95% of the PRBS words, the average cost of Equations (59) can be estimated as follows: i.) for pass one, 7 operations in the PRBS, 3 operations in the test, then 5% of the time, approximately 30 operations to check thoroughly for zero sequences, giving an average of approximately (10+0.05.30), or approximately 11.5 operations per word; ii.) for pass two, 6 operations for the partial PRBS and merge, 3 operations in the test, then 5% of the time, approximately 30 operations to check thoroughly for zero sequences, giving an average of approximately (9+0.05.30), or about 10.5 operations per word. Therefore, for the present example, the total cost of performing Equations (59) is approximately 22 operations per word on average, not including control overhead.

The sequence NZ=(W<<1)+(W<<2)+(W<<3)+ . . . + (W<<14) is expensive in terms of processing cost (e.g., number of operations and the like). This sequence will not be executed for most PRBS words, because of the pre-filtering discussed above and in accordance with exemplary embodiments of the present invention. However, it is possible to optimize the Equations (59) further by replacing the sequence of fourteen single bit shifts by an approximate doubling sequence. The test being made (for each of the upper 18 bits in parallel) is for any non-zero bits in the fourteen bits to the right of the bit under examination. The linear sequence of shifts can be replaced by a doubling sequence.

According to exemplary embodiments, first, the bits that have a bit set immediately to the bit's right can be located. These bits can be located using, for example, the following equation:

$$RNZ1 = (W<<1) \qquad (60)$$

Next, locate those bits that have a bit set in either of the two places to their right. This will be true for any bit for which the bit to the right is one, or for which the bit to that bit's right is zero. These bits can be located using, for example, the following equation (where "+" represents an INCLUSIVE-OR operation):

$$RNZ2 = RNZ1 + (RNZ1<<1) \qquad (61)$$

Equation (61) is a mask indicating those bits that have a one bit somewhere in the two bits places to the right. Next, locate those bits that have a bit set in any of the four places to their right. This will be true for any bit for which either of the two right bits are one, or for which the bit two to the right has a bit set within two bits of its right. These bits can be located using, for example, the following equation:

$$RNZ4 = RNZ2 + (RNZ2<<2) \qquad (62)$$

Similarly, those bits that have at least one set bit in the eight bits to the right can be located. These bits can be located using, for example, the following equation:

$$RNZ8 = RNZ4 + (RNZ4<<4) \qquad (63)$$

The next doubling step would look at the 16 bits to the right. However, this is too far, since only the next 14 bits are of interested. These bits can be located using, for example, the following equations:

$$RNZ6 = RNZ2 + (RNZ4<<2)$$

$$RNZ14 = RNZ6 + (RNZ8<<6) \qquad (64)$$

The final value of Equations (64), RNZ14, is valid for the top 18 bits, and indicates those bits for which there is at least one set bit within the 14 bits to the right. The inverse of this value, therefore, indicates those bits that are followed by 14 zero bits, and can be coerced to a one. The 14 shifts and 13 INCLUSIVE-ORs of the original linear shift sequence are thus replaced by 6 shifts and 5 INCLUSIVE-ORs, saving 16 operations. However, Equations (64) are executed approximately 5% of the time, so the average saving is approximately 0.8 operations per pass, or approximately 1.6 operations for each word. Therefore, for the present example, the total cost of the QRBS function, according to exemplary embodiments of the present invention, is approximately 20.4 operations per 32-bit output word. Those of ordinary skill in the art will recognize that other quasi-doubling shift sequences are possible and produce essentially the same performance. Those of ordinary skill in the art will also recognize that the aforementioned methodologies can be applied to any processor of any word length.

One of the optimizations discussed previously was to calculate only the top bits of the next PRBS word. However, the full PRBS word can be calculated on the next iteration of the entire QRBS algorithm. According to an alternative exemplary embodiment, the next PRBS word can be calculated in full (adding four operations), then its value cached for use in the next iteration (saving 7 operations) for a net savings of approximately three operations per word.

The PRBS generators under study are special cases of a larger set of linear feedback shift register (LFSR) algorithms. In a generalized LFSR, there can be EXCLUSIVE-OR feedback from any of the shift register stages to any earlier shift register stages. Furthermore, there can also be input data being fed into the first stage of the shift register (e.g., being EXCLUSIVE-OR'ed with feedback from later stages).

One set of LFSR algorithms of particular interest are those used for cyclic redundancy check (CRC) calculations. In these calculations, input data is fed in to the first stage, and there is EXCLUSIVE-OR feedback from the last stage to one or more of the earlier stages. The earlier stages that get the feedback are defined by the CRC polynomial. The output from the shift register can be discarded until all the input data have been entered, at which point the contents of the shift register is the CRC. Exemplary embodiments of the present invention can be applicable to CRC calculations. Thus, according to exemplary embodiments, the shift register can be a linear feedback shift register.

The class of LFSR used for CRC calculations have the property that the following sequences produce identical results (where n is the number of stages in the CRC LFSR): i.) for the first sequence, run n cycles of the LFSR, feeding in one bit of input data on each cycle; and ii.) for the second sequence, run n cycles of the LFSR, without feeding in any input data, and perform an EXCLUSIVE-OR operation between the next n bits of input data and the shift register contents. These two sequence produce the same result, because, in the CRC LFSR, there is feedback only from the last stage in the SR. Therefore, the first n values that are fed back can only be a function of the contents of all the stages at the start of those n iterations. In other words, any input data—which is input to the first stage—does not exert any influence on the output of the last stage until that influence has had time to propagate through all of the shift register stages, and that takes one cycle per stage, or n stages in total.

If the feedback value for the first n cycles is independent of the input data, then the effect of the input data on the shift register contents after n cycles can only result from it being propagated up the shift register chain, one stage per clock cycle. As EXCLUSIVE-OR is not order sensitive (i.e., $A \oplus B = B \oplus A$ and $(A \oplus B) \oplus C = A \oplus (B \oplus C)$), so it does not matter whether the input bits are propagated upwards stage by stage during the n cycles, or whether they are applied en masse at the end of the n cycles. Using this realization, the techniques according to exemplary embodiments of the present invention can be used. The LFSR in this case can be extended at the low end, if necessary, to a full processor word length. The single bit EXCLUSIVE-OR equations for each bit can be derived directly from the shift register movements and EXCLUSIVE-OR feedback. These equations can then be iterated word-length times to give a new set of equations that represent word-length iterations of the CRC calculation.

Thus, the W-step set of bit equations can be simulated and grouped to produce a set of shifts and masks using the same techniques as for the various PRBS generating functions. The CRC can be implemented directly from the resultant shifts and masks. For a word size W, there can be at most (2W−1) shift and mask terms: one with a zero shift, (W−1) left shifts and (W−1) right shifts. The shift/mask equations for CRCs can be, in general, more complex than those for PRBS. In particular, for complex CRCs (such as, for example, CRC-32), masks of the form "0 . . . 1 . . . 0 . . . 1 . . . 0" emerge, i.e., masks with sequences of one bits surrounding a sequence of zero bits. The methodology used to simplify masks in the PRBS function generation assumes that the most complex mask can be of the form "0 . . . 1 . . . 0." According to exemplary embodiments, these masks can be simplified by creating a new mask with 1 bits corresponding to the low order zeroes, and twice applying a new term with this mask. For example, the term (x>>12) & 0x00FFFF00 is identical to the pair of terms:

$$((x>>12) \& 0x00FFFFFF) \oplus ((x>>12) \& 0x000000FF) \quad (65)$$

The more complex masks that arise from the CRC matrix may require additional processing. Each hole in the mask can be filled in by creating a new bit mask with one bits corresponding to the hole, and applying the bit mask twice. For example, the term (x>>12) & 0x0F0F0F00 can be replaced by the pair of terms:

$$((x>>12) \& 0x0FFF0F00) \oplus ((x>>12) \& 0x00F00000) \quad (66)$$

The second hold in the bit mask in the first term of Equation (66) can be similarly removed, leaving three terms as follows:

$$((x>>12) \& 0x0FFFFF00) \oplus ((x>>12) \& 0x0000F000) \oplus$$

$$((x>>12) \& 0x00F00000) \quad (67)$$

Each of the terms in Equation (67) can be further replaced by two terms with simple masks, as discussed previously, to produce a total of six terms, each of which can have their respective bit masks replaced by equivalent shifts. Once all of the bit masks have been reduced to shifts, the resulting expression can be examined, as for the PRBS, for common sub-expressions that can be factored out.

Furthermore, instead of shifts, the original W-skip bit equations can be translated into a set of rotate and mask terms. There can be at most W of these rotate and mask terms, since with a rotate the distance any bit moves to reach any other bit is in the range 0 to W−1. If no further simplification is done, an upper bound on the CRC calculation is approximately three operations per bit: W rotates, W masks, W EXCLUSIVE-ORs, and the final EXCLUSIVE-OR of the next word of input data.

Figure 2A:
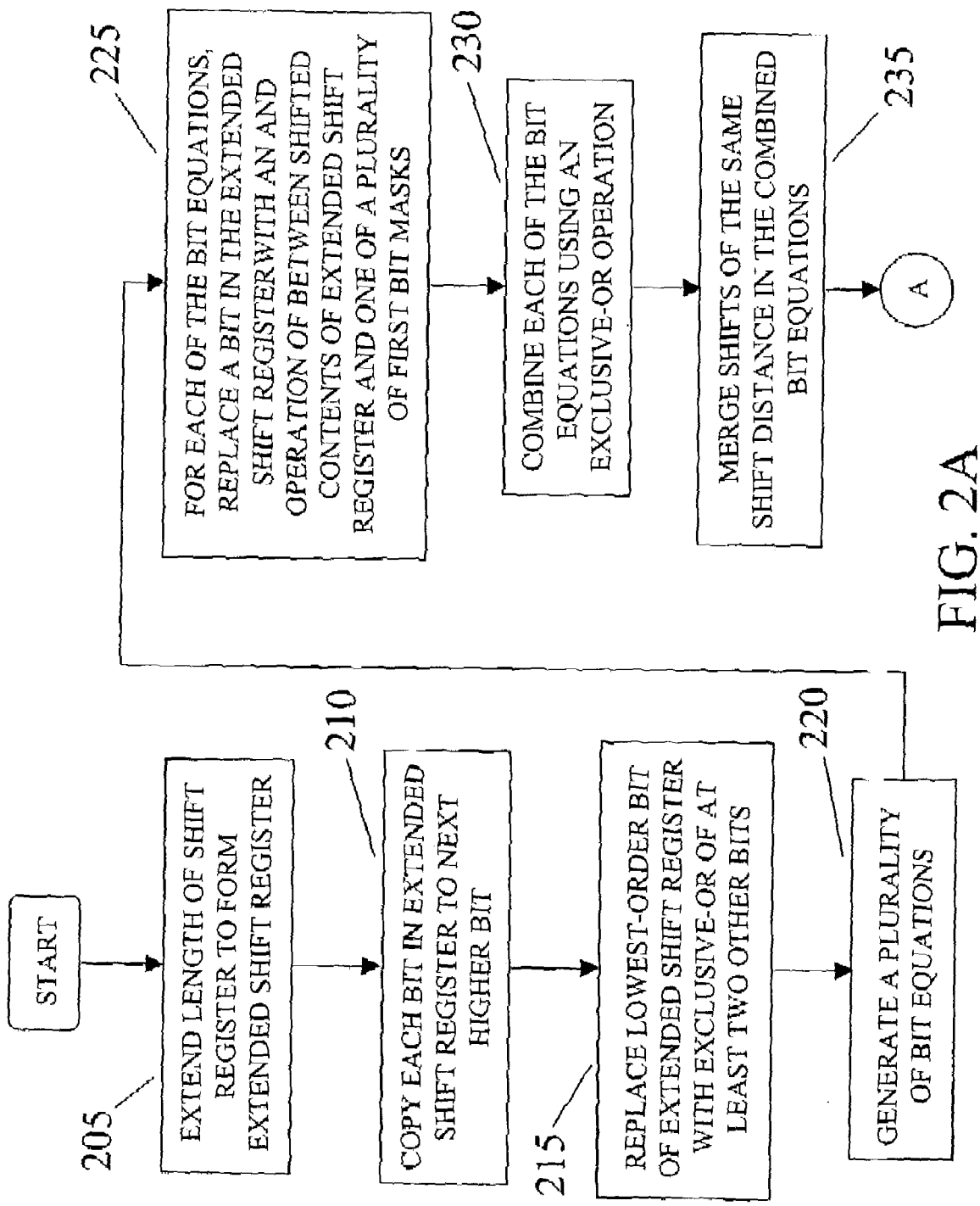
FIGS. 2A and 2B are flowcharts illustrating steps for producing functions for generating pseudo-random bit sequences, in accordance with an exemplary embodiment of the present invention.
Figure 2B:
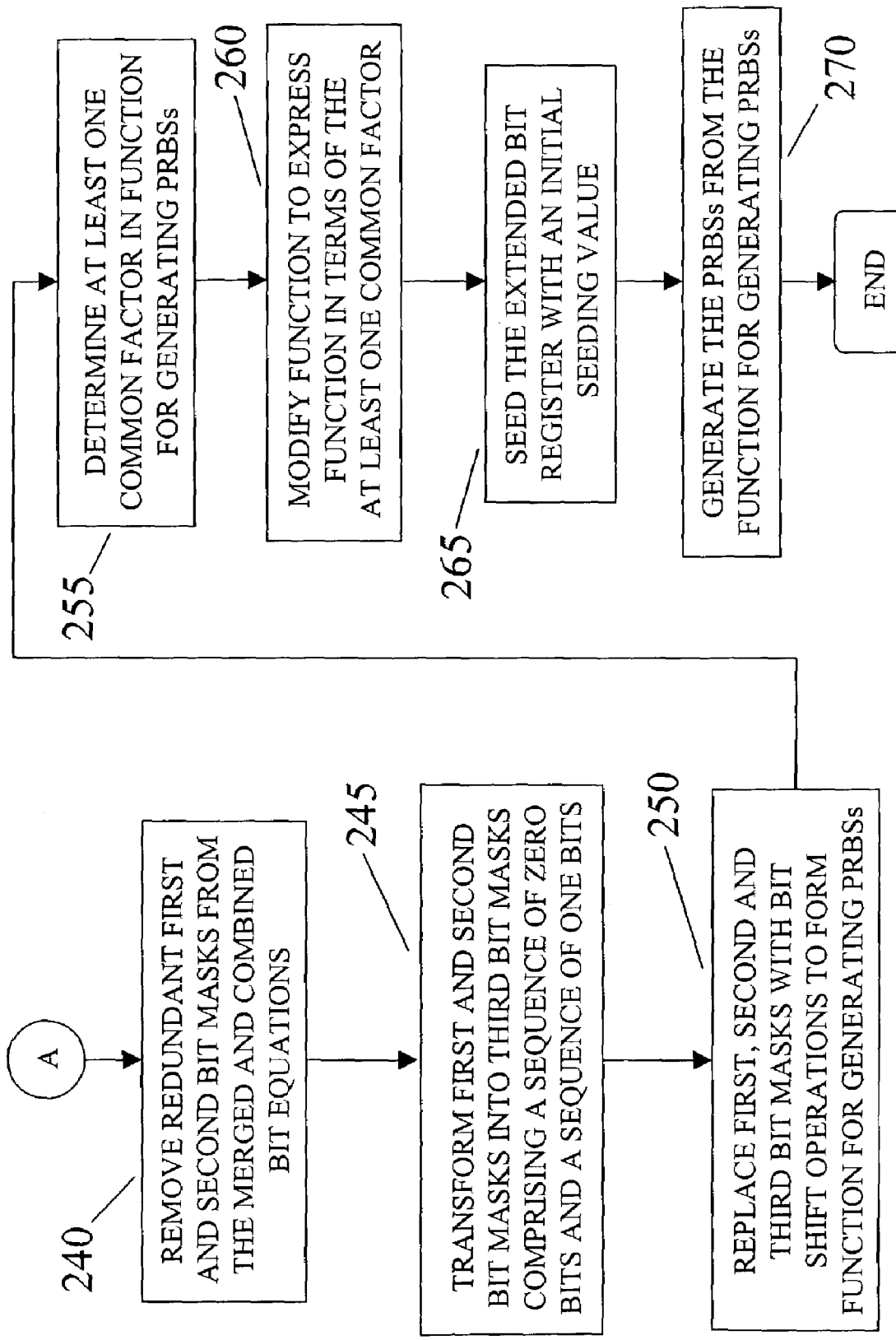

FIGS. 2A and 2B are flowcharts illustrating steps for producing functions for generating pseudo-random bit sequences, in accordance with an exemplary embodiment of the present invention. In step 205 of FIG. 2A, a length of a shift register can be extended to form an extended shift register. According to exemplary embodiments, the length of the extended shift register can be at least the word length of a central processing unit. The central processing unit can be, for example, any type of processor. The extended shift register can be comprised of a plurality of bits of information. In step 210, each bit in the extended shift register can be copied or otherwise shifted to a next higher bit. In step 215, the lowest-order bit of the extended shift register can be replaced with an EXCLUSIVE-OR operation of at least two other bits in the extended shift register. In step 220, a plurality of bit equations can be generated. According to exemplary embodiments, each of the plurality of bit equations is associated with a bit in the extended shift register, and each of the plurality of bit equations comprises an EXCLUSIVE-OR operation of at least two other bits of the extended shift register from an iteration of a predetermined number of iterations of the plurality of bit equations. The predetermined number of iterations can be at least the word length of the extended shift register.

For each of the plurality of bit equations, in step 225, a bit in the extended shift register can be replaced with an AND operation between a shift of the contents of the extended shift register, to move the bit to a predetermined position within the extended shift register, and one of a plurality of first bit masks applied to the shifted contents of the extended shift register to isolate the bit. In step 230, each of the plurality of bit equations can be combined using an EXCLUSIVE-OR operation. In step 235, shifts of a same shift distance can be merged in the combined plurality of bit equations. A plurality of second bit masks can be applied to the merged shifts. Each of the plurality of second bit masks comprises an OR operation between the first bit masks associated with the shifts of the same shift distance.

In step 240 of FIG. 2B, redundant first and second bit masks can be removed from the merged and combined plurality of bit equations. The redundant first and second bit masks zero the same bits as those zeroed by a shift associated with the first and second bit masks.

In step 245, at least one of the plurality of first and second bit masks in the merged and combined plurality of bit equations can be transformed into an associated one of a plurality of third bit masks. The third bit masks comprise a sequence of zero bits and a sequence of one bits. The transformation can be performed when the at least one of the plurality of first and second bit masks is not of the form of a sequence of zero bits and a sequence of one bits, i.e., they are not "simple." In step 250, the plurality of first, second and third bit masks can be replaced with bit shift operations in the merged and combined plurality of bit equations, to form a function for generating the pseudo-random bit sequences. In step 255, at least one common factor can be determined in the function for generating the pseudo-random bit sequences. In step 260, the function can be modified to express the function in terms of the at least one common factor. In step 265, the extended shift register can be seeded with an initial seeding value. In step 270, the pseudo-random bit sequences can be generated from the function for generating the pseudo-random bit sequences.

Figure 3:
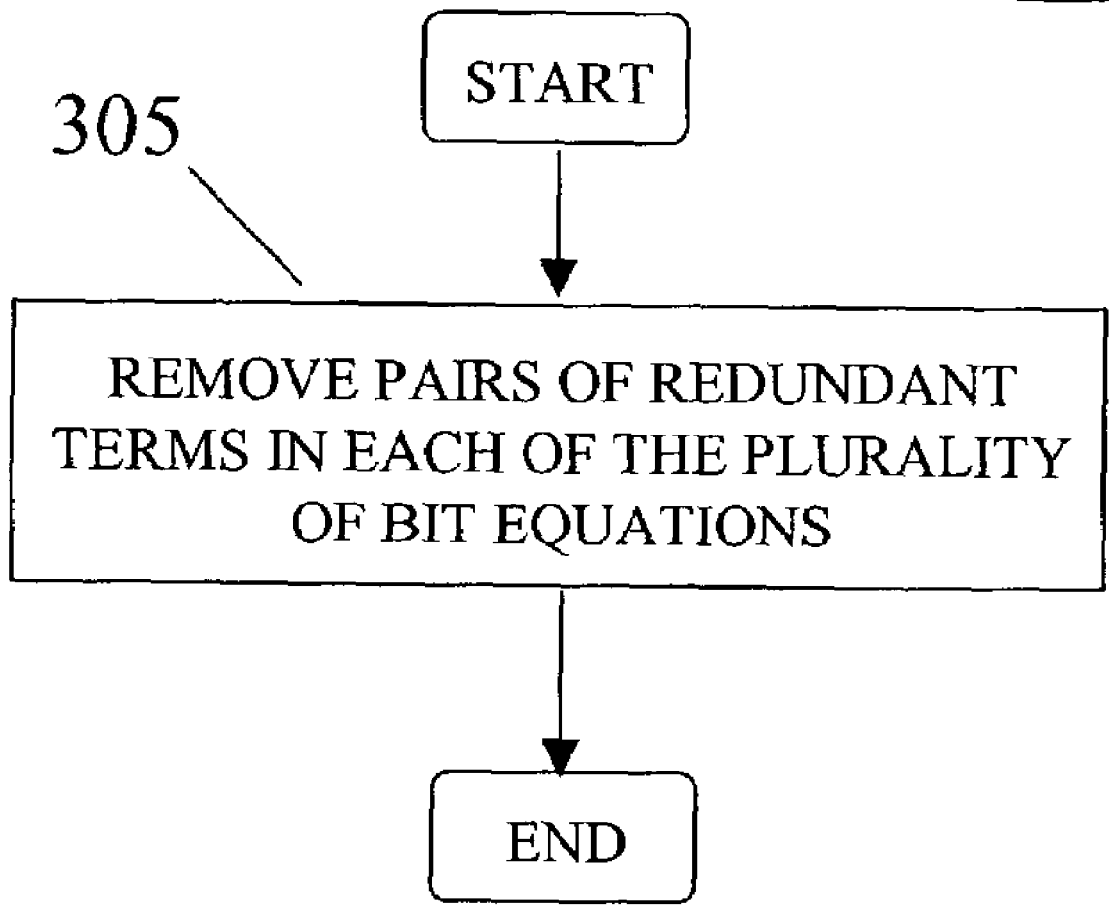
FIG. 3 is a flowchart illustrating steps for generating a plurality of bit equations, in accordance with an exemplary embodiment of the present invention.

FIG. 3 is a flowchart illustrating steps for generating a plurality of bit equations, in accordance with an exemplary embodiment of the present invention. For the step 220 of generating the plurality of bit equations of FIG. 2A, in step 305 of FIG. 3, pairs of redundant terms can be removed in each of the plurality of bit equations. A pair of redundant terms comprises an EXCLUSIVE-OR operation between two of the same term.

Figure 4:
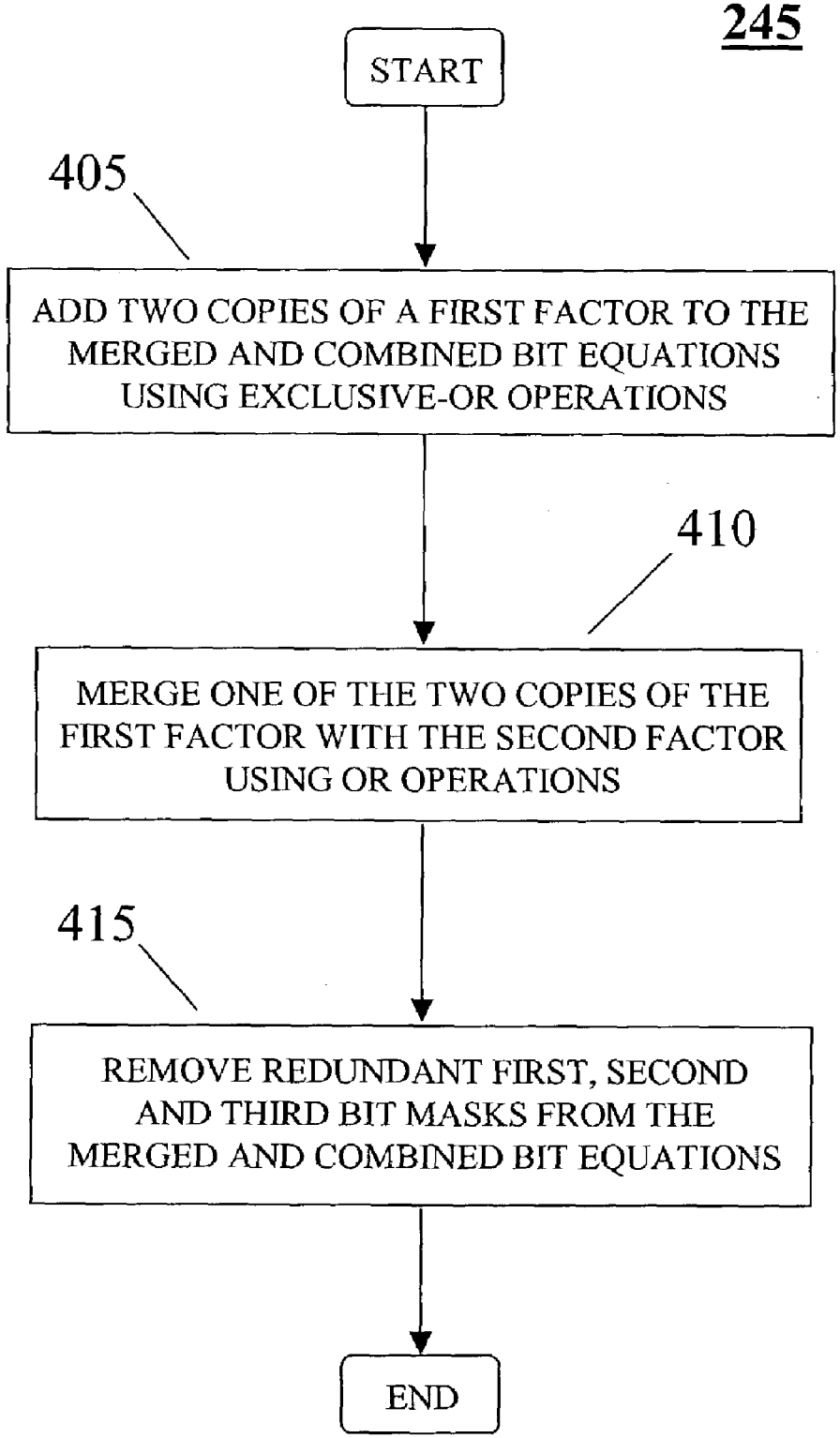
FIG. 4 is a flowchart illustrating steps for transforming bit masks, in accordance with an exemplary embodiment of the present invention.

FIG. 4 is a flowchart illustrating steps for transforming bit masks, in accordance with an exemplary embodiment of the present invention. For the step 245 of transforming bit masks of FIG. 2B, in step 405 of FIG. 4, two copies of a first factor can be added to the merged and combined plurality of bit equations using an EXCLUSIVE-OR operation between the two copies of the first factor and the merged and combined plurality of bit equations. The two copies of the first factor have the same shift distance as a second factor in the merged and combined plurality of bit equations. The transformation can be performed when the first or second bit mask associated with the second factor is not comprised of the sequence of zero bits and the sequence of one bits. In step 410, one of the two copies of the first factor can be merged with the second factor by performing an OR operation between a bit mask associated with the one of the two copies of the first factor and the first or second bit mask associated with the second factor, to transform the first or second bit mask associated with the second factor into a third bit mask. The third bit mask comprises the sequence of zero bits and the sequence of one bits. In step 415, redundant first, second and third bit masks can be removed from the merged and combined plurality of bit equations. The redundant first, second and third bit masks zero the same bits as those zeroed by a shift associated with the first, second and third bit masks.

Figure 5:
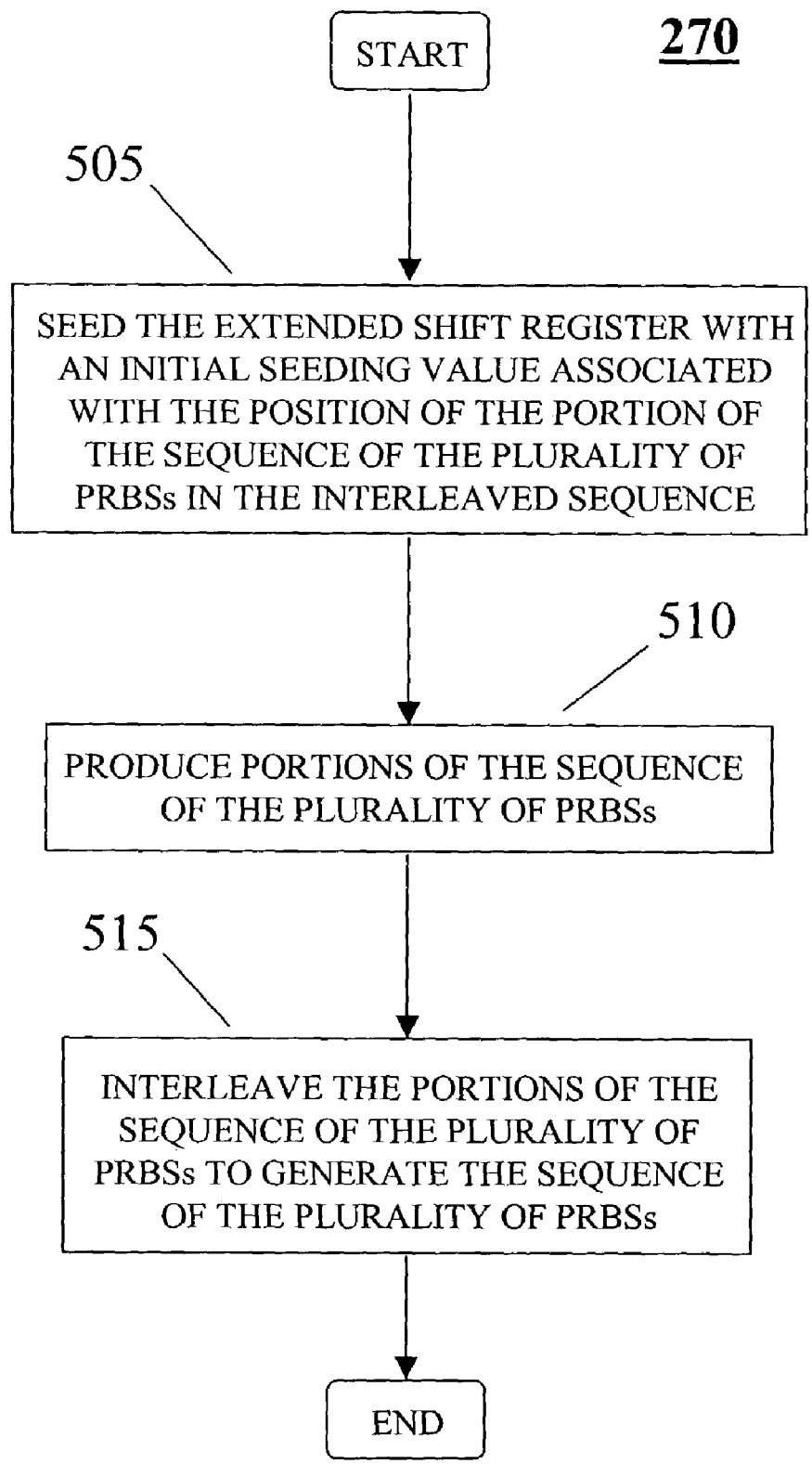
FIG. 5 is a flowchart illustrating steps for producing portions of a sequence of a plurality of pseudo-random bit sequences, in accordance with an exemplary embodiment of the present invention.

FIG. 5 is a flowchart illustrating steps for producing portions of a sequence of a plurality of pseudo-random bit sequences, in accordance with an exemplary embodiment of the present invention. According to exemplary embodiments, the predetermined number of iterations of the plurality of bit equations can be a multiple of the word length of the extended shift register. In step 505, the extended shift register can be seeded with an initial seeding value associated with a position of the portion of the sequence of the plurality of pseudo-random bit sequences in the interleaved sequence. In step 510, portions of a sequence of a plurality of PRBSs can be produced. The portions are used to generate the sequence of the plurality of PRBSs. In step 515, the portions of the sequence of the plurality of PRBSs can be interleaved to generate the sequence of the plurality of PRBSs.

Figure 6:
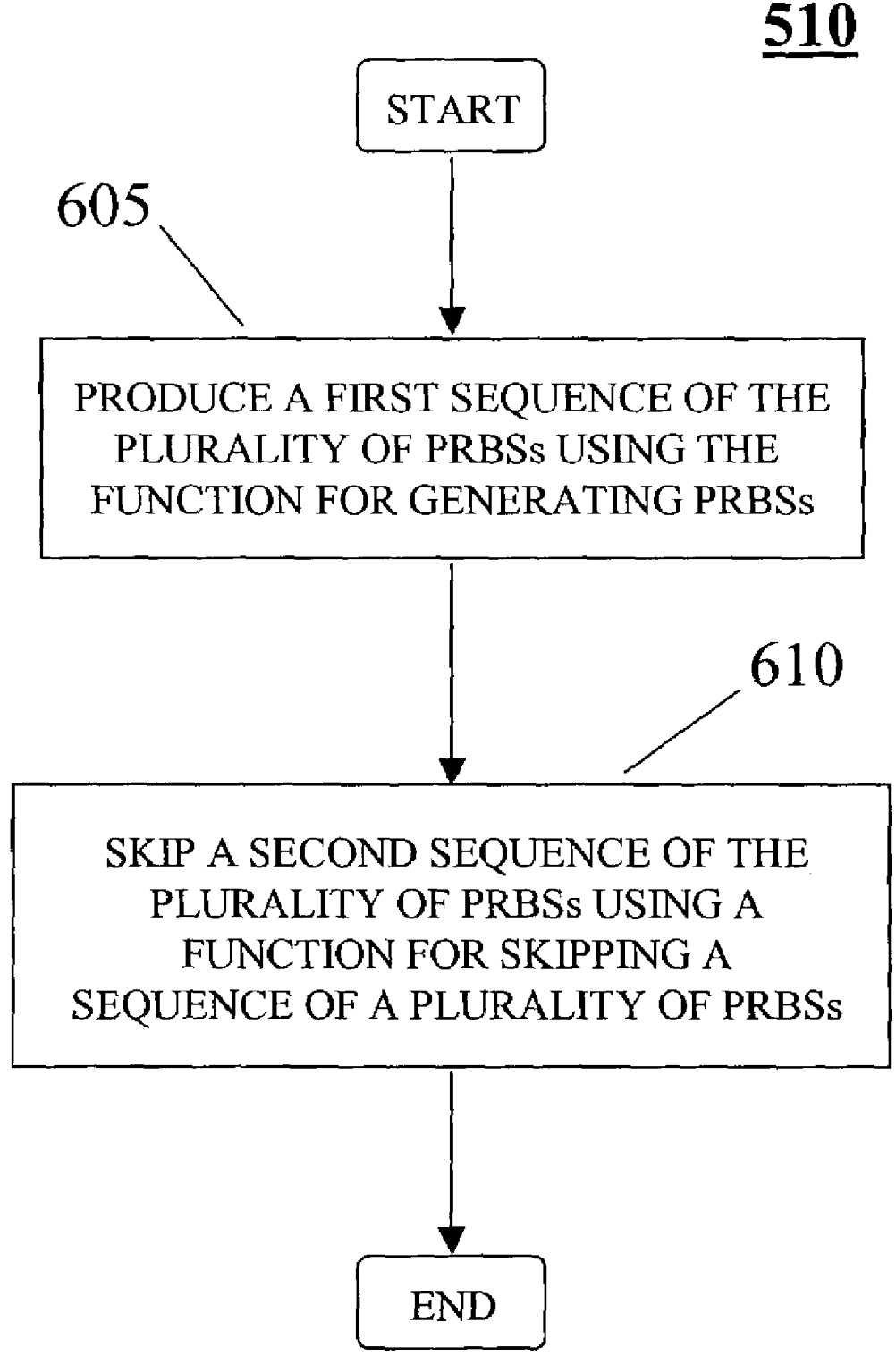
FIG. 6 is a flowchart illustrating steps for producing portions of a sequence of a plurality of pseudo-random bit sequences, in accordance with an exemplary embodiment of the present invention.

FIG. 6 is a flowchart illustrating steps for producing portions of a sequence of a plurality of pseudo-random bit sequences, in accordance with an exemplary embodiment of the present invention. For step 510 for producing portions of a sequence of a plurality of pseudo-random bit sequences of FIG. 5, in step 605 of FIG. 6, a first sequence of the plurality of pseudo-random bit sequences can be produced using the function for generating pseudo-random bit sequences. In step 610, a second sequence of the plurality of pseudo-random bit sequences can be skipped using a function for skipping a sequence of a plurality pseudo-random bit sequences.

Figure 7:
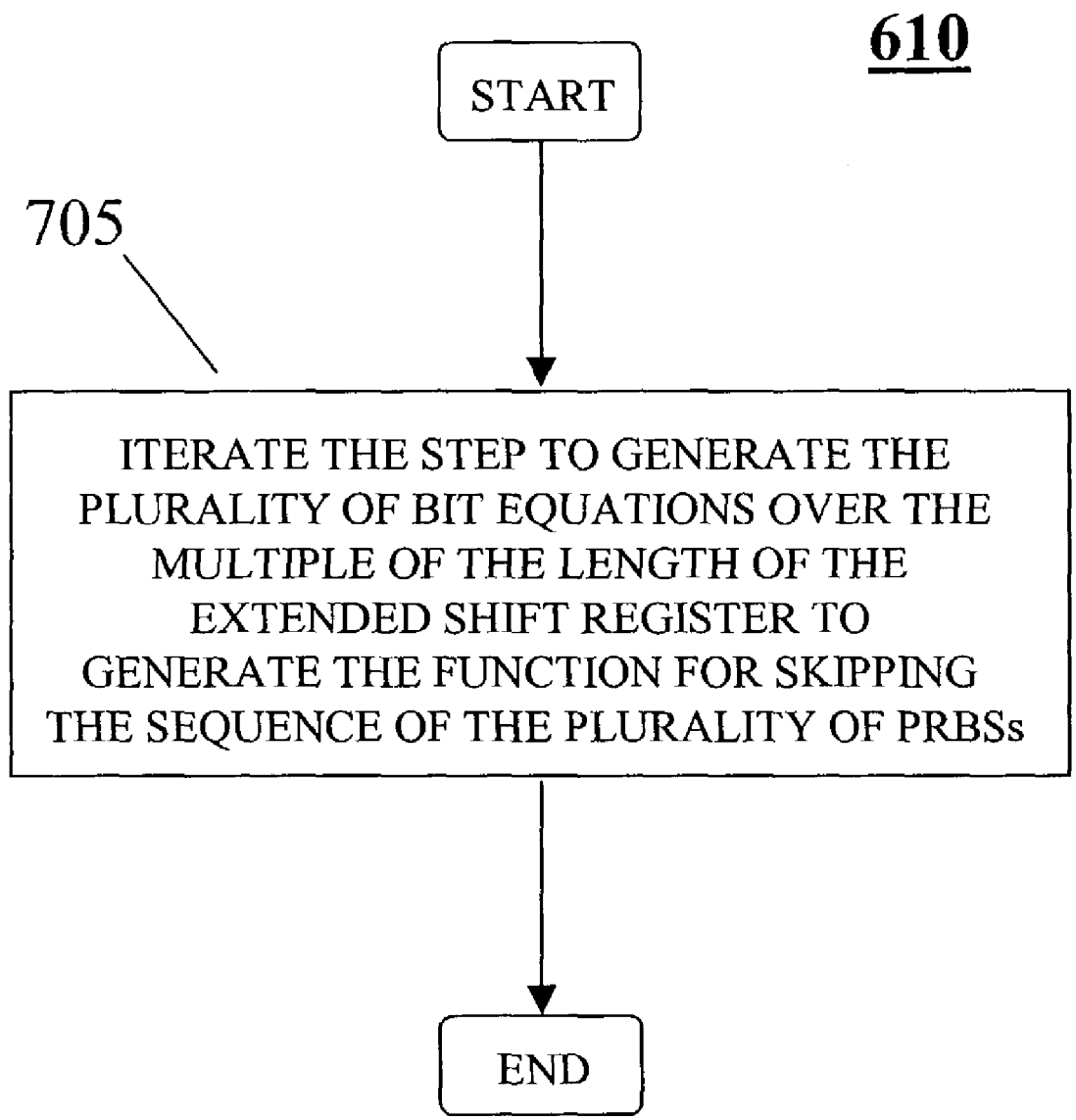
FIG. 7 is a flowchart illustrating steps for skipping a second sequence of a plurality of pseudo-random bit sequences, in accordance with an exemplary embodiment of the present invention.

FIG. 7 is a flowchart illustrating steps for skipping the second sequence of a plurality of pseudo-random bit sequences, in accordance with an exemplary embodiment of the present invention. For step 610 for skipping a second sequence of FIG. 6, in step 705 of FIG. 7, the step to generate the plurality of bit equations (i.e., step 220 of FIG. 2A) can be iterated over the multiple of the word length of the extended shift register, to generate the function for skipping a sequence of the plurality of pseudo-random bit sequences, as described previously.

Figure 8:
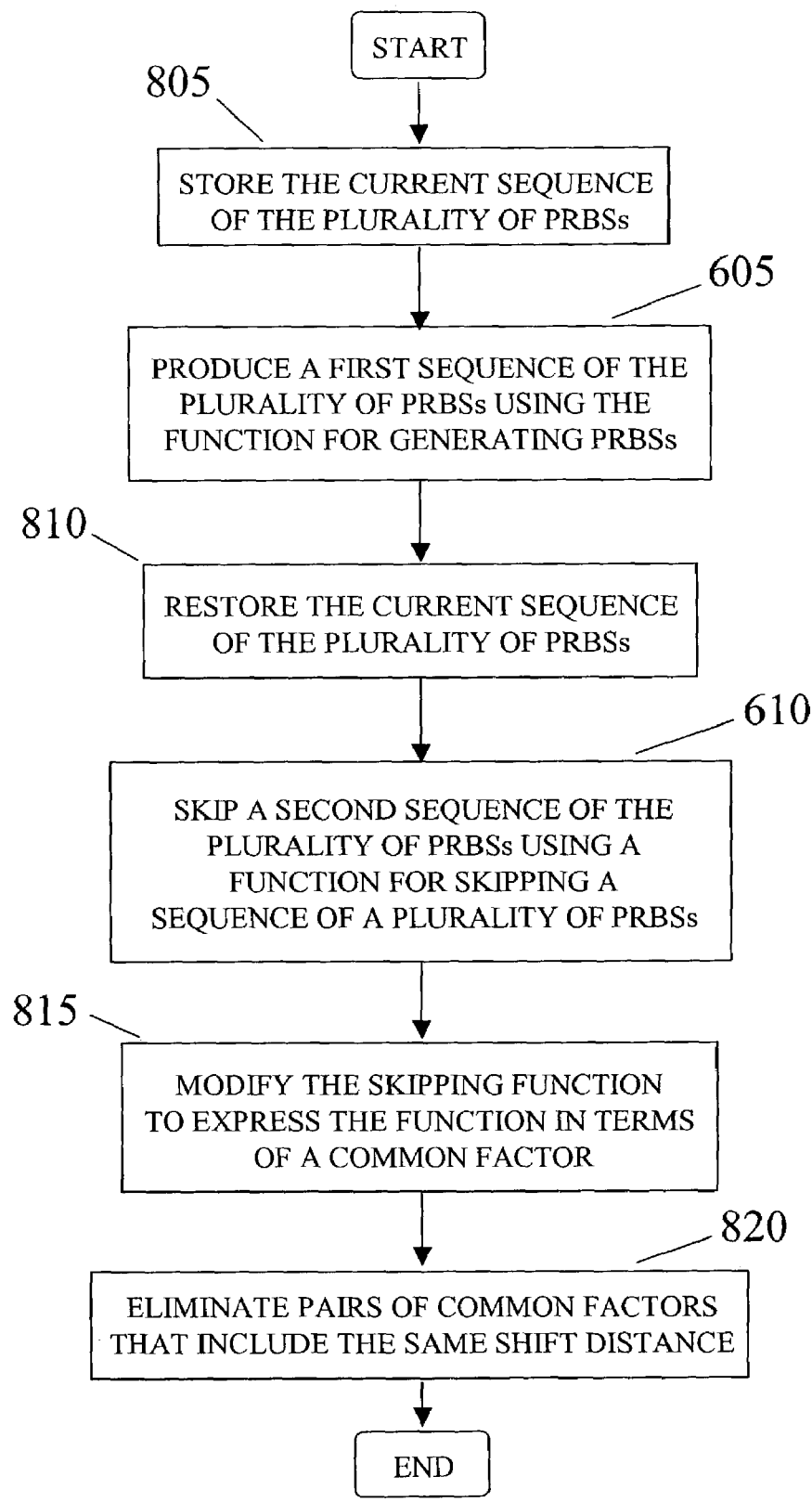
FIG. 8 is a flowchart illustrating steps for producing portions of a sequence of a plurality of pseudo-random bit sequences, in accordance with an alternative exemplary embodiment of the present invention.

FIG. 8 is a flowchart illustrating steps for producing portions of a sequence of a plurality of pseudo-random bit sequences, in accordance with an alternative exemplary embodiment of the present invention. In step 805, a current sequence of the plurality of pseudo-random bit sequences can be stored before producing the first sequence of the plurality of pseudo-random bit sequences. Step 605 is the same step as that illustrated in FIG. 6. In step 810, the current sequence can be restored before skipping the second sequence. For the step of skipping the second sequence, the skip length for the second sequence comprises the length of the sequence of the plurality of pseudo-random bit sequences, to make the skip length a power of two. Step 610 is the same step as that illustrated in FIG. 6. In step 815, the function for skipping the sequence of the plurality pseudo-random bit sequences can be modified to express the function in terms of a common factor. In step 820, pairs of common factors that include a same shift distance can be eliminated.

Figure 9:
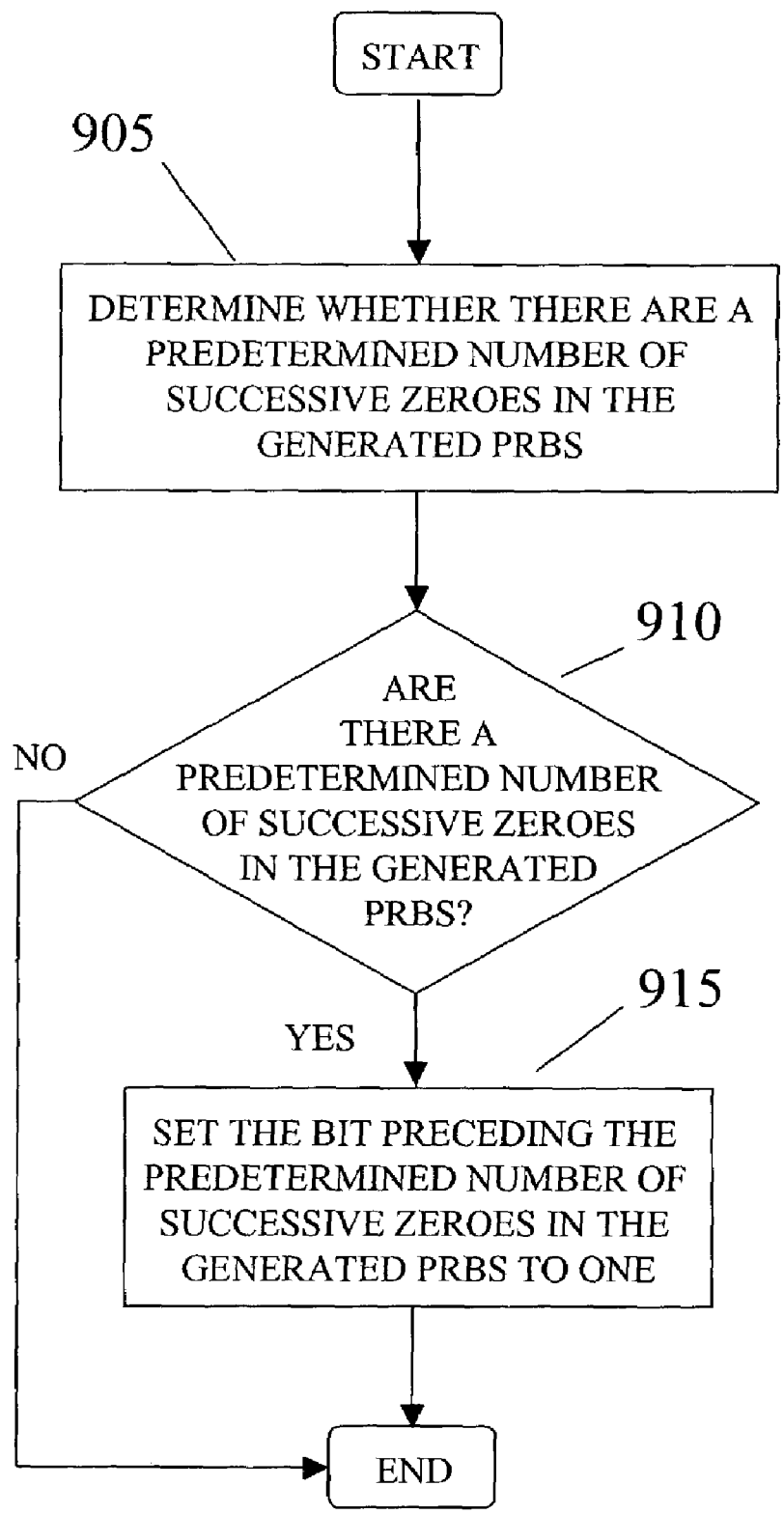
FIG. 9 is a flowchart illustrating steps for determining the presence of a sequence of a predetermined number of successive zeroes in a generated pseudo-random bit sequence, in accordance with an exemplary embodiment of the present invention.

FIG. 9 is a flowchart illustrating steps for determining the presence of a sequence of a predetermined number of successive zeroes in a generated pseudo-random bit sequence, in accordance with an exemplary embodiment of the present invention, for the quasi-random bit sequence (QRBS). In step 905, a determination can be made as to whether there are a predetermined number of successive zeroes in the generated pseudo-random bit sequence. In accordance with exemplary embodiments, the predetermined number of successive zeroes can be fourteen, although the predetermined number of successive zeroes can be any number. If it is determined in step 910 that there are a predetermined number of successive zeroes in the generated pseudo-random bit sequence, then in step 915, a bit in the generated pseudo-random bit sequence can be set to one, where the bit precedes the predetermined number of successive zeroes.

Figure 10:
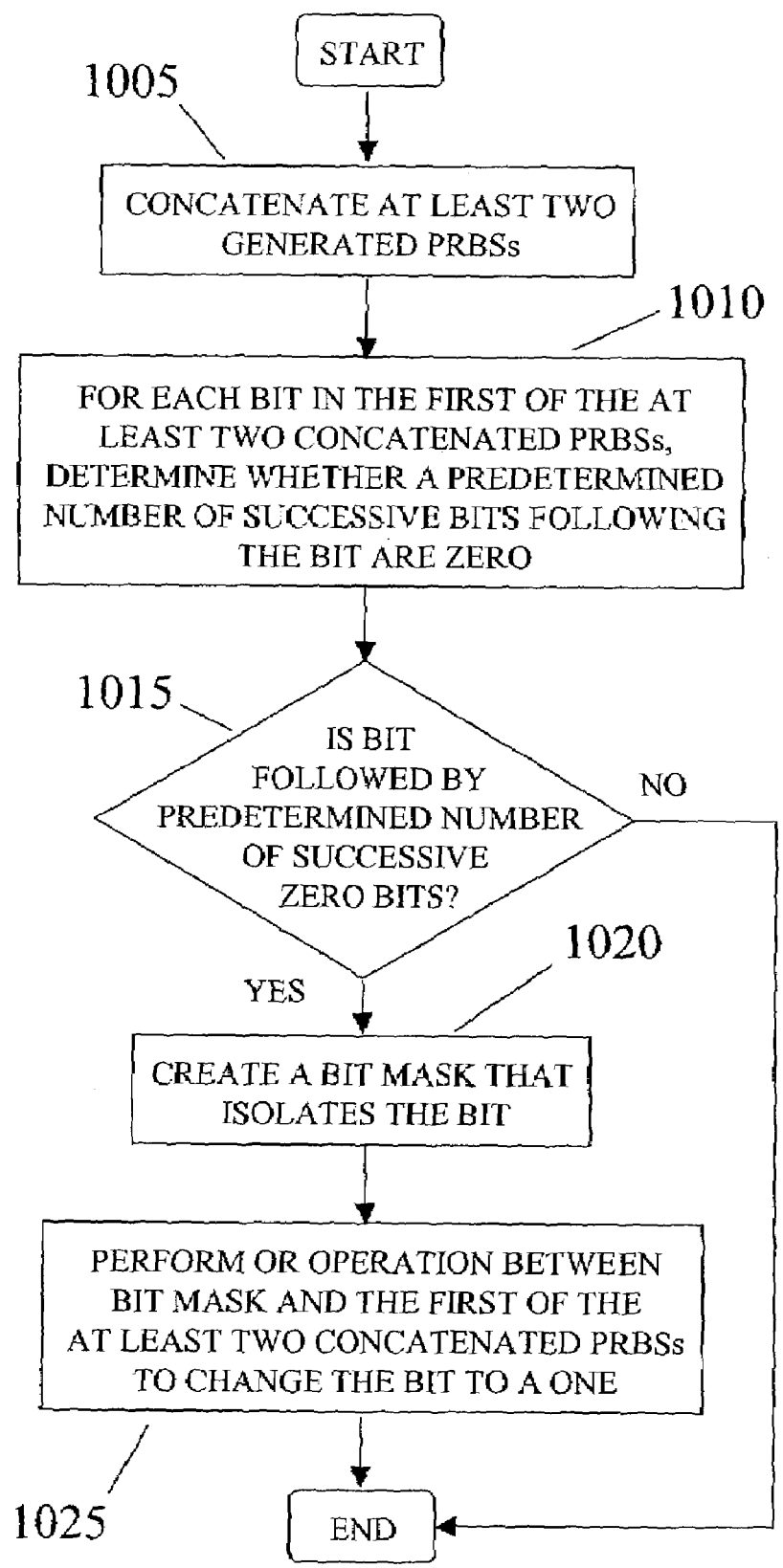
FIG. 10 is a flowchart illustrating steps for determining the presence of a sequence of a predetermined number of successive zeroes in a generated pseudo-random bit sequence, in accordance with an alternative exemplary embodiment of the present invention.

FIG. 10 is a flowchart illustrating steps for determining the presence of a sequence of a predetermined number of successive zeroes in a generated pseudo-random bit sequence, in accordance with an alternative exemplary embodiment of the present invention, for the QRBS. According to the alternative exemplary embodiment, at least two pseudo-random bit sequences can be generated from the function for generating the pseudo-random bit sequences. In step 1005, the at least two generated pseudo-random bit sequences can be concatenated together. For each bit in the first of the at least two concatenated pseudo-random bit sequences, in step 1010 a determination can be made as to whether a predetermined number of successive bits following the bit are zero. According to this alternative exemplary embodiment, the predetermined number of successive zeroes can be fourteen, although the predetermined number of successive zeroes can be any number. If it is determined in step 1015 that the bit is followed by the predetermined number of successive zero bits, then in step 1020 a bit mask can be created that isolates the bit and, in step 1025, an OR operation can be performed between the bit mask that isolates the bit and the first of the at least two concatenated pseudo-random bit sequences to change the bit to a one, as discussed previously.

The steps of a computer program as illustrated in FIGS. 2–10 for producing functions for generating pseudo-random bit sequences can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Exemplary embodiments of the present invention can be used in, for example, communications testing equipment for testing communication links in computer networks. For example, exemplary embodiments of the present invention can be used in communications testing equipment, available from SPIRENT™ Communications of Rockville, Inc. (15200 Omega Drive, Rockville, Md. 20850), that employ PRBS generation for various forms of bit error rate (BER) testing, such as: Model No. 6732-51, "OC-12 Test Unit," that performs BER testing for DS-3, STS-1, STS-3 and STS-12; Model No. 6733-51, "OC-3 Test Unit," that performs BER testing for DS-3, STS-1 and STS-3; Model No. 6716-51, "DS-1 Test Unit," that performs DS-1 BER testing; Model No. 6717-53, "Data Test," that performs BER testing for fractional DS-1, DDS and DS-0; and Model No. 3525-01, "U-DSL Interface," that performs ISDN BER testing. However, exemplary embodiments of the present invention can be used in or with any communication or other electronic devices that generate or use PRBSs, such as, for example, correlating time domain reflectometers, code-dependent data multiplexers, noise generators, cryptographic devices, gaming machines, and the like.

It will be appreciated by those of ordinary skill in the art that the present invention can be embodied in various specific forms without departing from the spirit or essential characteristics thereof. The presently disclosed embodiments are considered in all respects to be illustrative and not restrictive. For example, those of ordinary skill in the art will recognize that exemplary embodiments of the present invention can be used with any type of processor, of any processor word length, using any number of processors and/or processor threads to produce functions for generating any type of PRBS of any length. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated herein by reference in their entireties.

The invention claimed is:

1. A system for producing functions for generating pseudo-random bit sequences, comprising:
   a memory that stores the steps of a computer program to:
   extend a length of a shift register to form an extended shift register, wherein the extended shift register is comprised of a plurality of bits of information;
   copy each bit in the extended shift register to a next higher bit;
   replace a lowest-order bit of the extended shift register with an EXCLUSIVE-OR operation of at least two other bits in the extended shift register;
   generate a plurality of bit equations, wherein each of the plurality of bit equations is associated with a bit in the extended shift register, wherein each of the plurality of bit equations comprises an EXCLUSIVE-OR operation of at least two other bits of the extended shift register from an iteration of a predetermined number of iterations of the plurality of bit equations;
   for each of the plurality of bit equations, replace a bit in the extended shift register with an AND operation between a shift of the contents of the extended shift register, to move the bit to a predetermined position within the extended shift register, and one of a plurality of first bit masks applied to the shifted contents of the extended shift register to isolate the bit;
   combine each of the plurality of bit equations using an EXCLUSIVE-OR operation;
   merge shifts of a same shift distance in the combined plurality of bit equations, wherein a plurality of second bit masks is applied to the merged shifts, and wherein each of the plurality of second bit masks comprises an OR operation between the first bit masks associated with the shifts of the same shift distance;

remove redundant first and second bit masks from the merged and combined plurality of bit equations, wherein the redundant first and second bit masks zero the same bits as those zeroed by a shift associated with the first and second bit masks;

transform at least one of the plurality of first and second bit masks in the merged and combined plurality of bit equations into an associated one of a plurality of third bit masks comprising a sequence of zero bits and a sequence of one bits, when the at least one of the plurality of first and second bit masks is comprised of an absence of the sequence of zero bits and the sequence of one bits;

replace the plurality of first, second and third bit masks with bit shift operations in the merged and combined plurality of bit equations, to form a function for generating the pseudo-random bit sequences;

generate the pseudo-random bit sequences from the function for generating the pseudo-random bit sequences;

a processor for accessing the memory to execute the computer program; and utilizing at least one of the pseudo-random bit sequences in communications equipment for transmitting or receiving communications data.

2. The system of claim 1, wherein the memory stores the steps of a computer program to:

determine at least one common factor in the function for generating the pseudo-random bit sequences; and modify the function to express the function in terms of the at least one common factor.

3. The system of claim 1, wherein the length of the extended shift register is at least a word length of a central processing unit.

4. The system of claim 1, wherein the predetermined number of iterations is a word length of the extended shift register.

5. The system of claim 1, wherein for the step to generate the plurality of bit equations, the memory stores the steps of a computer program to:

remove pairs of redundant terms in each of the plurality of bit equations, wherein a pair of redundant terms comprises an EXCLUSIVE-OR operation between two of the same term.

6. The system of claim 1, wherein the memory stores the steps of a computer program to:

seed the extended shift register with an initial seeding value.

7. The system of claim 1, wherein for the step to transform bit masks, the memory stores the steps of a computer program to:

add two copies of a first factor to the merged and combined plurality of bit equations using an EXCLUSIVE-OR operation between the two copies of the first factor and the merged and combined plurality of bit equations, wherein the two copies of the first factor have a same shift distance as a second factor in the merged and combined plurality of bit equations, wherein one of the first and second bit masks associated with the second factor has an absence of the sequence of zero bits and the sequence of one bits; and merge one of the two copies of the first factor with the second factor by performing an OR operation between a bit mask associated with the one of the two copies of the first factor and the one of the first and second bit masks associated with the second factor, to transform the one of the first and second bit masks associated with the second factor into a third bit mask comprising the sequence of zero bits and the sequence of one bits.

8. The system of claim 7, wherein for the step to transform bit masks, the memory further stores the step of a computer program to:

remove redundant first, second and third bit masks from the merged and combined plurality of bit equations, wherein the redundant first, second and third bit masks zero the same bits as those zeroed by a shift associated with the first, second and third bit masks.

9. The system of claim 1, wherein the predetermined number of iterations is a multiple of a word length of the extended shift register.

10. The system of claim 9, comprising:

at least a second processor for accessing the memory to execute the computer program.

11. The system of claim 10, wherein the memory stores steps of a computer program to:

generate a sequence of a plurality of pseudo-random bit sequences, wherein each of the processors produces a portion of the sequence of the plurality of pseudo-random bit sequences.

12. The system of claim 11, wherein to produce a portion of the sequence of the plurality of pseudo-random bit sequences, the memory stores the steps of a computer program to:

produce a first sequence of the plurality of pseudo-random bit sequences using the function for generating pseudo-random bit sequences; and skip a second sequence of the plurality of pseudo-random bit sequences using a function for skipping a sequence of a plurality pseudo-random bit sequences.

13. The system of claim 12, wherein to generate the function for skipping the sequence of the plurality of pseudo-random bit sequences, the memory stores the steps of a computer program to:

iterate the step to generate the plurality of bit equations over the multiple of the word length of the extended shift register.

14. The system of claim 12, wherein the memory stores steps of a computer program to:

store a current sequence of the plurality of pseudo-random bit sequences before producing the first sequence of the plurality of pseudo-random bit sequences; and restore the current sequence before skipping the second sequence, wherein for the step to skip the second sequence, a skip length for the second sequence comprises a length of the sequence of the plurality of pseudo-random bit sequences generated by the processors to make the skip length a power of two.

15. The system of claim 14, wherein the memory stores steps of a computer program to:

modify the function for skipping the sequence of the plurality pseudo-random bit sequences to express the function in terms of a common factor.

16. The system of claim 15, wherein the memory stores steps of a computer program to:

eliminate pairs of common factors that include a same shift distance.

17. The system of claim 11, wherein the memory stores steps of a computer program to:
  interleave the portions of the sequence of the plurality of pseudo-random bit sequences from each of the processors to generate the sequence of the plurality of pseudo-random bit sequences.

18. The system of claim 17, wherein the memory stores steps of a computer program to:
  seed the extended shift register associated with each of the processors with an initial seeding value associated with a position of the portion of the sequence of the plurality of pseudo-random bit sequences of each processor in the interleaved sequence.

19. The system of claim 1, wherein the memory stores steps of a computer program to:
  determine whether there are a predetermined number of successive zeroes in the generated pseudo-random bit sequence; and
  set a bit to one in the generated pseudo-random bit sequence, wherein the bit precedes the predetermined number of successive zeroes, when it is determined that there are a predetermined number of successive zeroes in the generated pseudorandom bit sequence.

20. The system of claim 19, wherein the predetermined number of successive zeroes is fourteen.

21. The system of claim 1, wherein at least two pseudo-random bit sequences are generated from the function for generating the pseudo-random bit sequences, and
  wherein the memory stores steps of a computer program to:
  concatenate the at least two generated pseudo-random bit sequences; for each bit in a first of the at least two concatenated pseudo-random bit sequences, determine whether a predetermined number of successive bits following the bit are zero; and
  when it is determined that the bit is followed by the predetermined number of successive zero bits, create a bit mask that isolates the bit and perform an OR operation between the bit mask that isolates the bit and the first of the at least two concatenated pseudo-random bit sequences to change the bit to a one.

22. The system of claim 21, wherein the predetermined number of successive bits is fourteen.

23. The system of claim 1, wherein the shift register is a linear feedback shift register.

24. A method for producing functions for generating pseudo-random bit sequences, comprising the steps of:
  extending a length of a shift register to form an extended shift register, wherein the extended shift register is comprised of a plurality of bits of information;
  copying each bit in the extended shift register to a next higher bit;
  replacing a lowest-order bit of the extended shift register with an EXCLUSIVE-OR operation of at least two other bits in the extended shift register;
  generating a plurality of bit equations, wherein each of the plurality of bit equations is associated with a bit in the extended, shift register, wherein each of the plurality of bit equations comprises an EXCLUSIVE-OR operation of at least two other bits of the extended shift register from an iteration of a predetermined number of iterations of the plurality of bit equations;
  for each of the plurality of bit equations, replacing a bit in the extended shift register with an AND operation between a shift of the contents of the extended shift register, to move the bit to a predetermined position within the extended shift register, and one of a plurality of first bit masks applied to the shifted contents of the extended shift register to isolate the bit;
  combining each of the plurality of bit equations using an EXCLUSIVE-OR operation;
  merging shifts of a same shift distance in the combined plurality of bit equations, wherein a plurality of second bit masks is applied to the merged shifts, and wherein each of the plurality of second bit masks comprises an OR operation between the first bit masks associated with the shifts of the same shift distance;
  removing redundant first and second bit masks from the merged and combined plurality of bit equations, wherein the redundant first and second bit masks zero the same bits as those zeroed by a shift associated with the first and second bit masks;
  transforming at least one of the plurality of first and second bit masks in the merged and combined plurality of bit equations into an associated one of a plurality of third bit masks comprising a sequence of zero bits and a sequence of one bits, when the at least one of the plurality of first and second bit masks is comprised of an absence of the sequence of zero bits and the sequence of one bits;
  replacing the plurality of first, second and third bit masks with bit shift operations in the merged and combined plurality of bit equations, to form a function for generating the pseudo-random bit sequences;
  generating the pseudo-random bit sequences from the function for generating the pseudo-random bit sequences; and
  utilizing at least one of the pseudo-random bit sequences in communications equipment for transmitting or receiving communications data.

25. The method of claim 24, comprising the steps of:
  determining at least one common factor in the function for generating the pseudo-random bit sequences; and
  modifying the function to express the function in terms of the at least one common factor.

26. The method of claim 24, wherein the length of the extended shift register is at least a word length of a central processing unit.

27. A computer-readable medium containing a computer program for producing functions for generating pseudo-random bit sequences, wherein the computer program performs the steps of:
  extending a length of a shift register to form an extended shift register, wherein the extended shift register is comprised of a plurality of bits of information;
  copying each bit in the extended shift register to a next higher bit;
  replacing a lowest-order bit of the extended shift register with an EXCLUSIVE-OR operation of at least two other bits in the extended shift register;
  generating a plurality of bit equations, wherein each of the plurality of bit equations is associated with a bit in the extended shift register, wherein each of the plurality of bit equations comprises an EXCLUSIVE-OR operation of at least two other bits of the extended shift register from an iteration of a predetermined number of iterations of the plurality of bit equations;
  for each of the plurality of bit equations, replacing a bit in the extended shift register with an AND operation between a shift of the contents of the extended shift register, to move the bit to a predetermined position within the extended shift register, and one of a plurality of first bit masks applied to the shifted contents of the extended shift register to isolate the bit;

combining each of the plurality of bit equations using an EXCLUSIVE-OR operation;

merging shifts of a same shift distance in the combined plurality of bit equations, wherein a plurality of second bit masks is applied to the merged shifts, and wherein each of the plurality of second bit masks comprises an OR operation between the first bit masks associated with the shifts of the same shift distance;

removing redundant first and second bit masks from the merged and combined plurality of bit equations, wherein the redundant first and second bit masks zero the same bits as those zeroed by a shift associated with the first and second bit masks;

transforming at least one of the plurality of first and second bit masks in the merged and combined plurality of bit equations into an associated one of a plurality of third bit masks comprising a sequence of zero bits and a sequence of one bits, when the at least one of the plurality of first and second bit masks is comprised of an absence of the sequence of zero bits and the sequence of one bits;

replacing the plurality of first, second and third bit masks with bit shift operations in the merged and combined plurality of bit equations, to form a function for generating the pseudo-random bit sequences;

generating the pseudo-random bit sequences from the function for generating the pseudo-random bit sequences; and utilizing at least one of the pseudo-random bit sequences in communications equipment for transmitting or receiving communications data.

28. The computer-readable medium of claim 27, wherein the computer program performs the steps of:

determining at least one common factor in the function for generating the pseudo-random bit sequences; and modifying the function to express the function in terms of the at least one common factor.

29. The computer-readable medium of claim 27, wherein the length of the extended shift register is at least a word length of a central processing unit.

* * * * *